US008254210B2

(12) United States Patent
Peacock et al.

(10) Patent No.: US 8,254,210 B2
(45) Date of Patent: Aug. 28, 2012

(54) HIGH FIDELITY DATA COMPRESSION FOR ACOUSTIC ARRAYS

(75) Inventors: G. Scott Peacock, Columbia, MD (US); Robert M. Patterson, Sykesville, MD (US)

(73) Assignee: The Johns Hopkins University, Baltimore, MD (US)

( * ) Notice: Subject to any disclaimer, the term of this patent is extended or adjusted under 35 U.S.C. 154(b) by 378 days.

(21) Appl. No.: 12/636,186

(22) Filed: Dec. 11, 2009

(65) Prior Publication Data

US 2011/0141845 A1   Jun. 16, 2011

(51) Int. Cl.
 *H04B 11/00* (2006.01)
(52) U.S. Cl. .......................................... 367/131; 367/134
(58) Field of Classification Search .................. 367/131, 367/134
 See application file for complete search history.

(56) References Cited

U.S. PATENT DOCUMENTS

| 4,034,370 A | 7/1977 | Mims |
| 5,703,906 A | 12/1997 | O'Brien, Jr. et al. |
| 5,963,591 A | 10/1999 | O'Brien, Jr. et al. |
| 6,597,634 B2 | 7/2003 | O'Brien, Jr. et al. |
| 7,339,519 B2 | 3/2008 | Picard |
| 2003/0043695 A1 | 3/2003 | O'Brien, Jr. et al. |
| 2005/0222775 A1* | 10/2005 | Kisra et al. .................. 702/14 |
| 2006/0200034 A1 | 9/2006 | Ricci et al. |
| 2006/0200035 A1 | 9/2006 | Ricci et al. |
| 2009/0190850 A1* | 7/2009 | Tang ........................ 382/251 |

FOREIGN PATENT DOCUMENTS

GB          2265710 A   * 10/1993

* cited by examiner

*Primary Examiner* — Ian Lobo
(74) *Attorney, Agent, or Firm* — Aisha Ahmad

(57) ABSTRACT

Techniques include determining coefficients of a complex auto regression (AR) model to fit a complex average spectrum at a base frequency resolution of a set of one or more measured acoustic beams during a time block. Residuals derived by filtering actual data through an inverse of the AR model are determined at frequencies below a first threshold frequency. A quantized spectrum of the residuals is determined at the base frequency resolution. Magnitude, phase, and frequency bin at the base frequency resolution are determined for each peak of a set of one or more narrowband peaks above a second threshold frequency for the set of one or more measured acoustic beams. A message is sent, which indicates without loss the coefficients of the AR model, the quantized spectrum of the residuals, and the frequency bin, magnitude and phase for each peak of the set of one or more narrowband peaks.

11 Claims, 13 Drawing Sheets

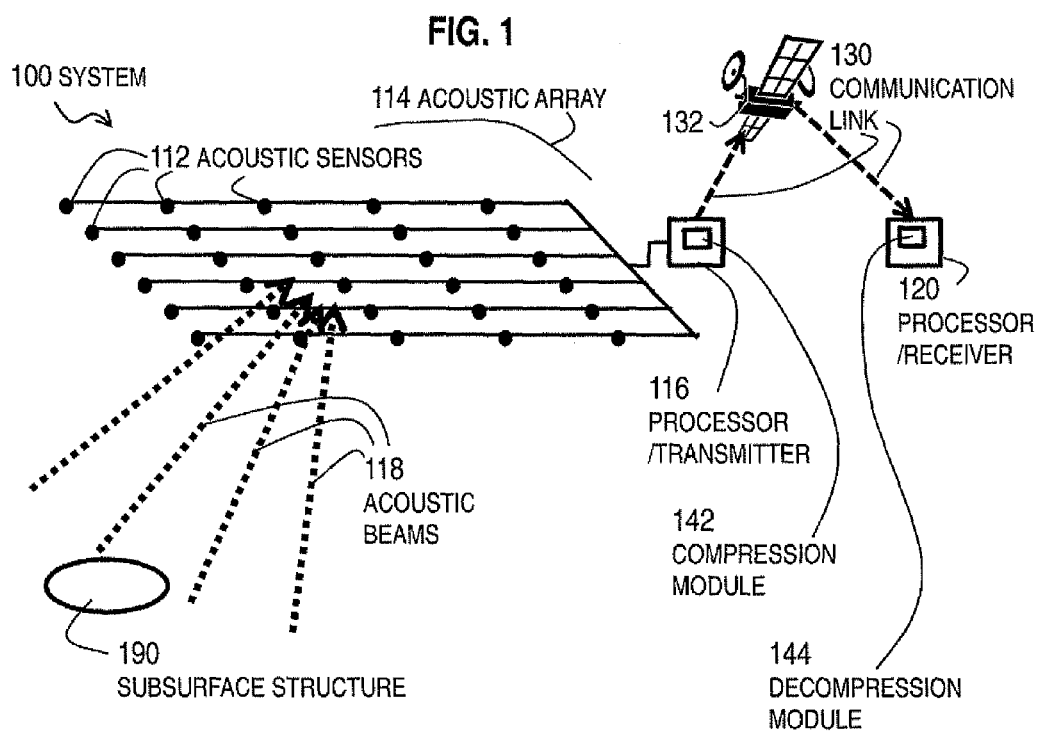
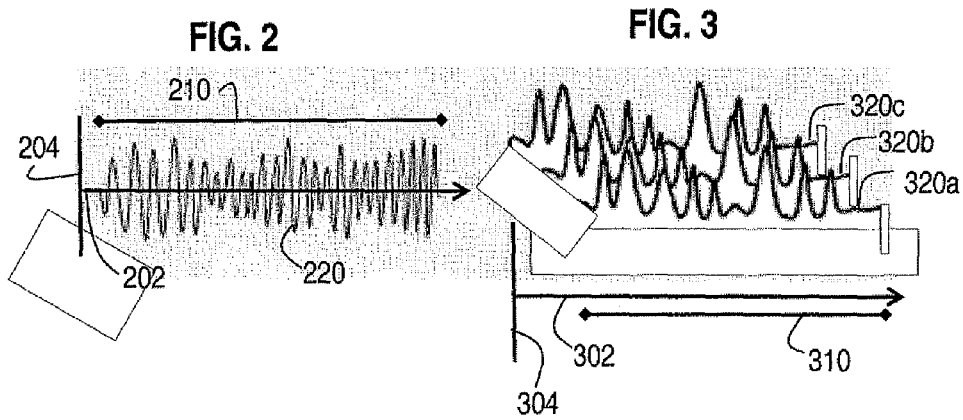

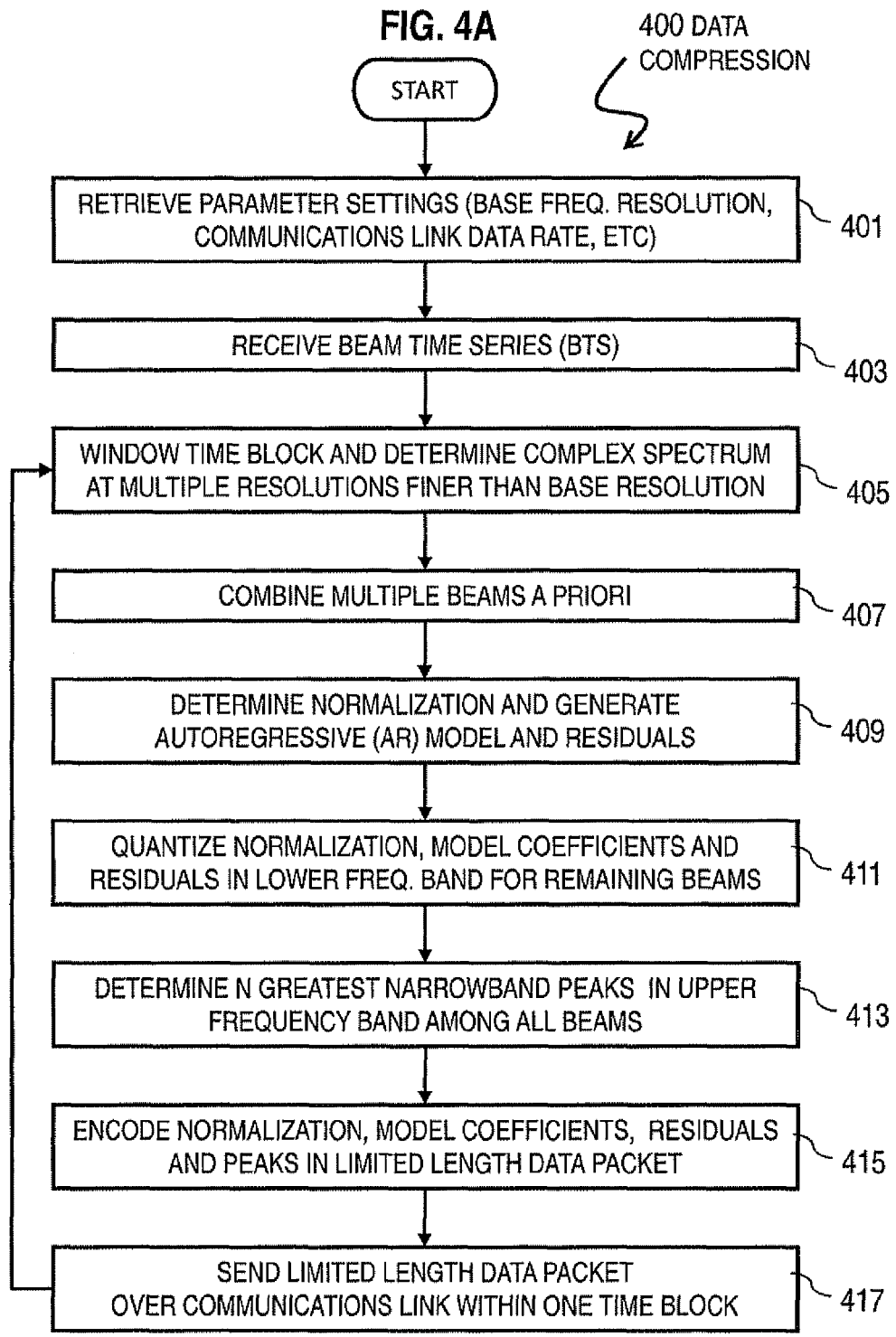

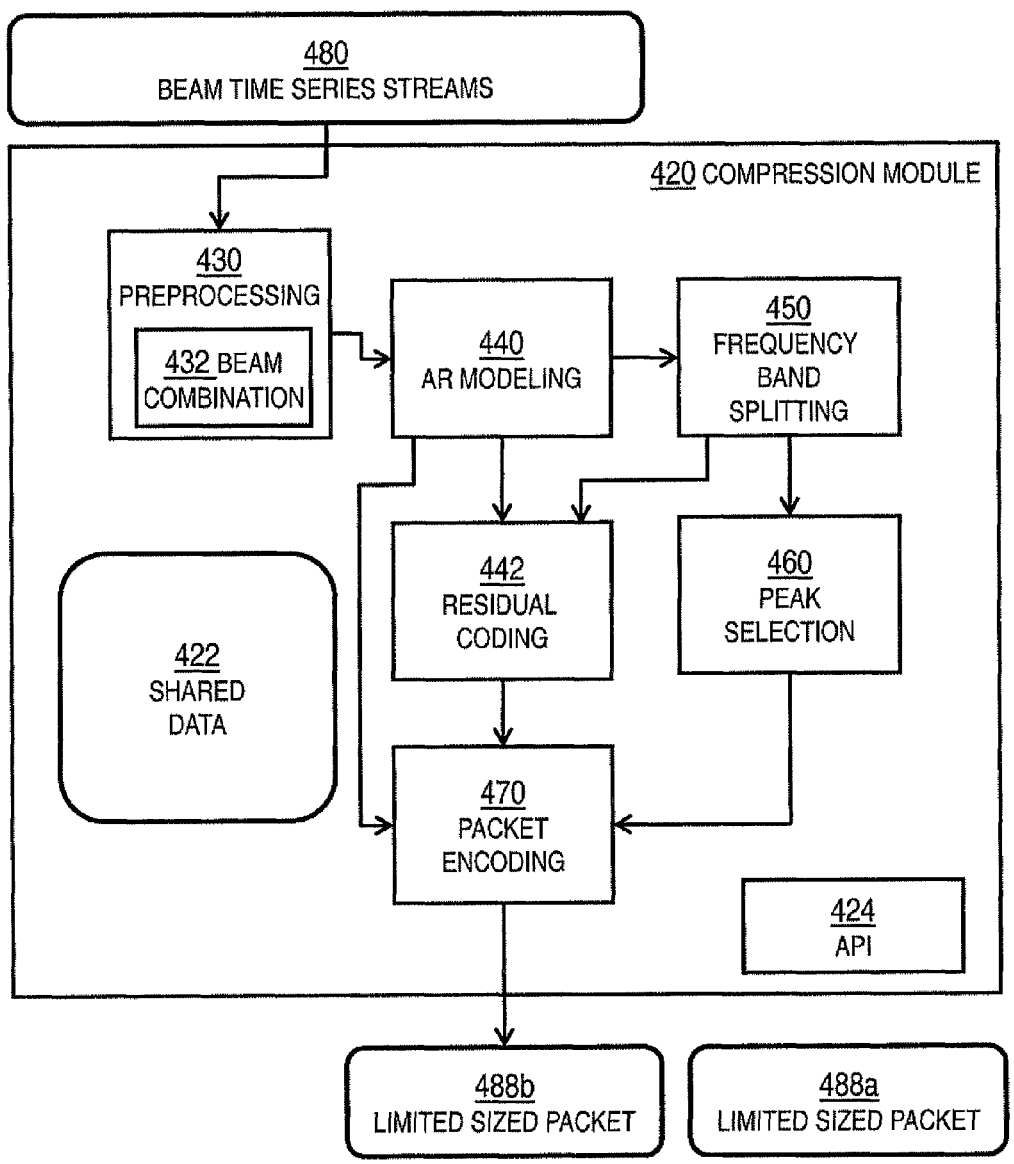

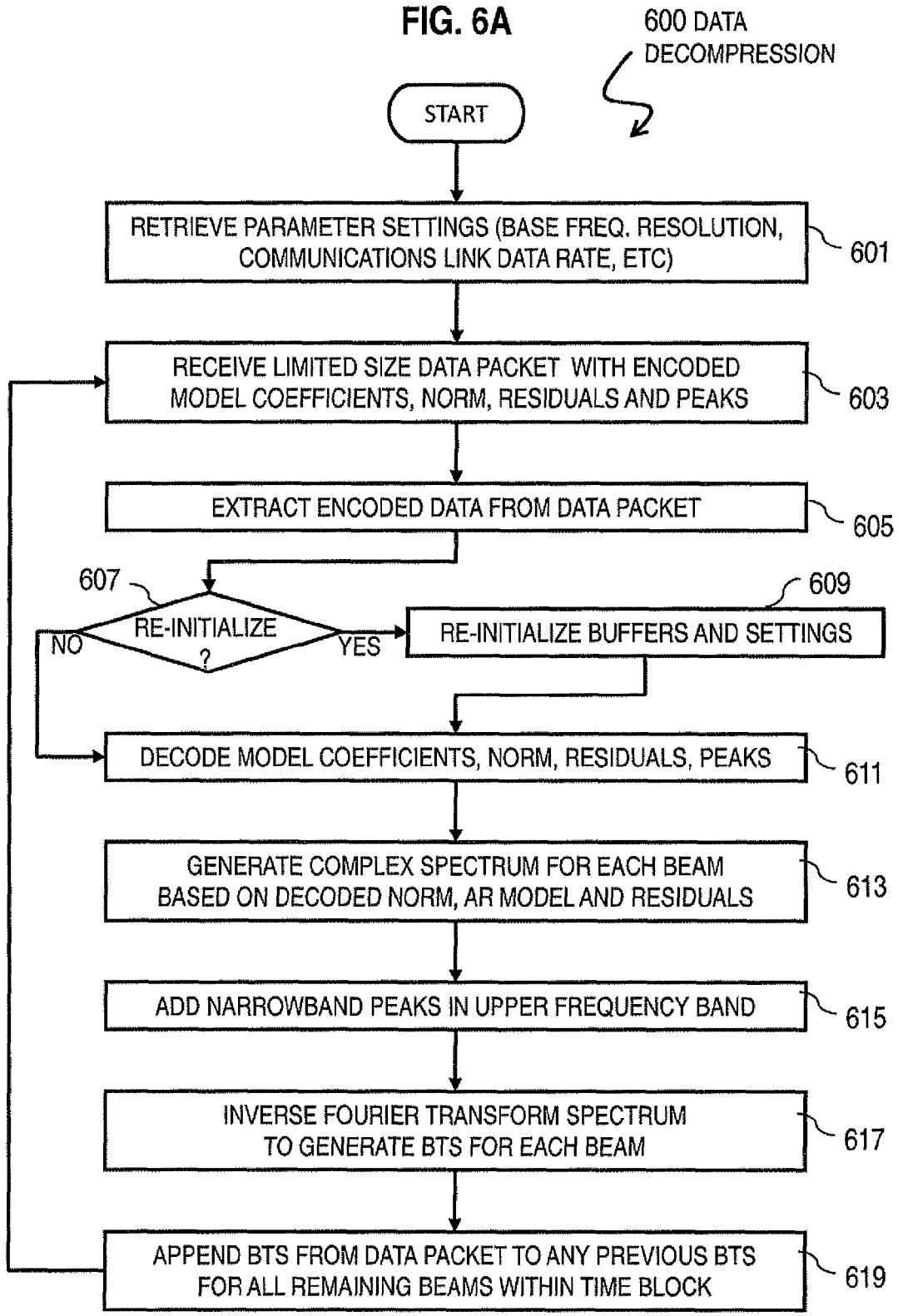

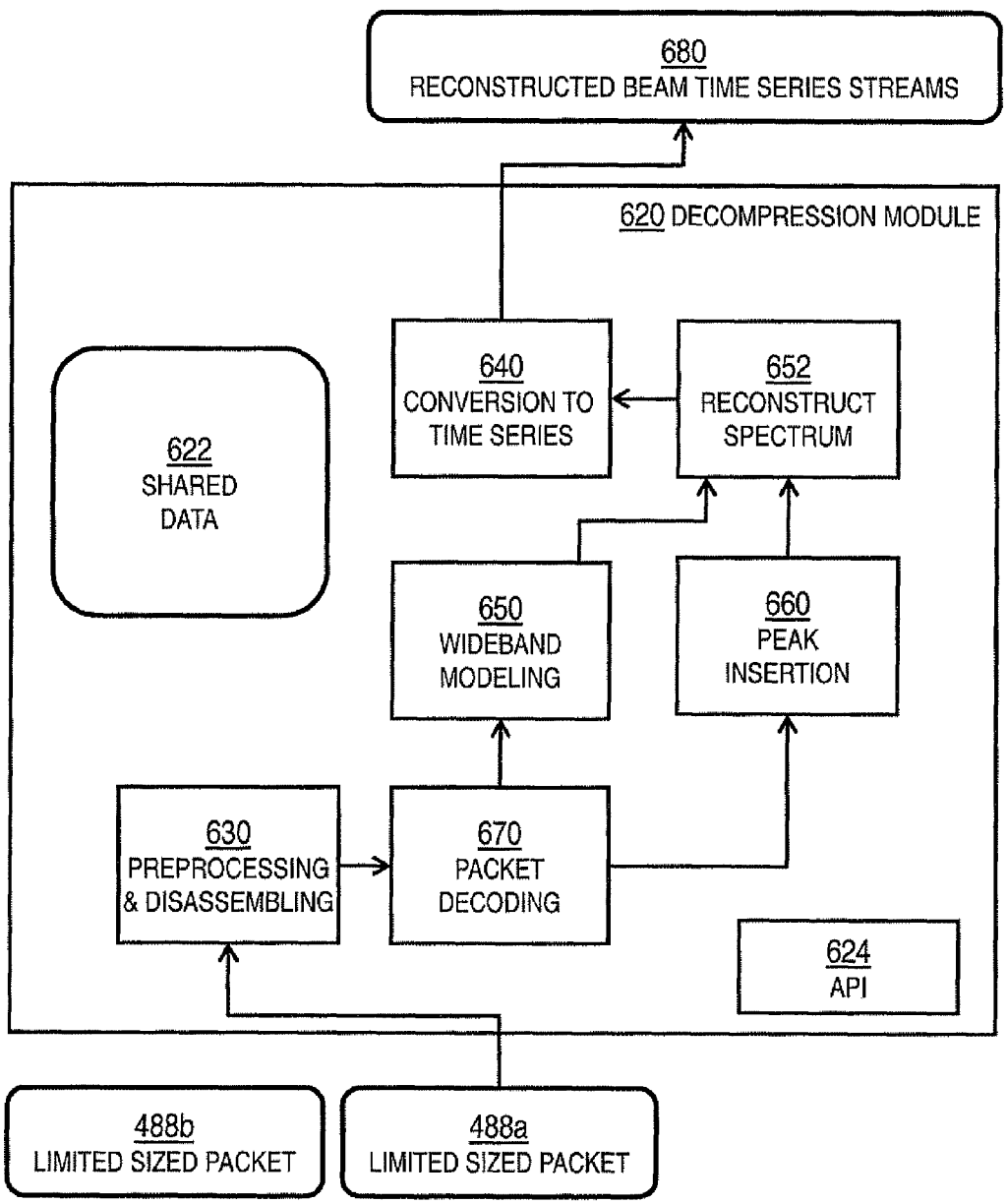

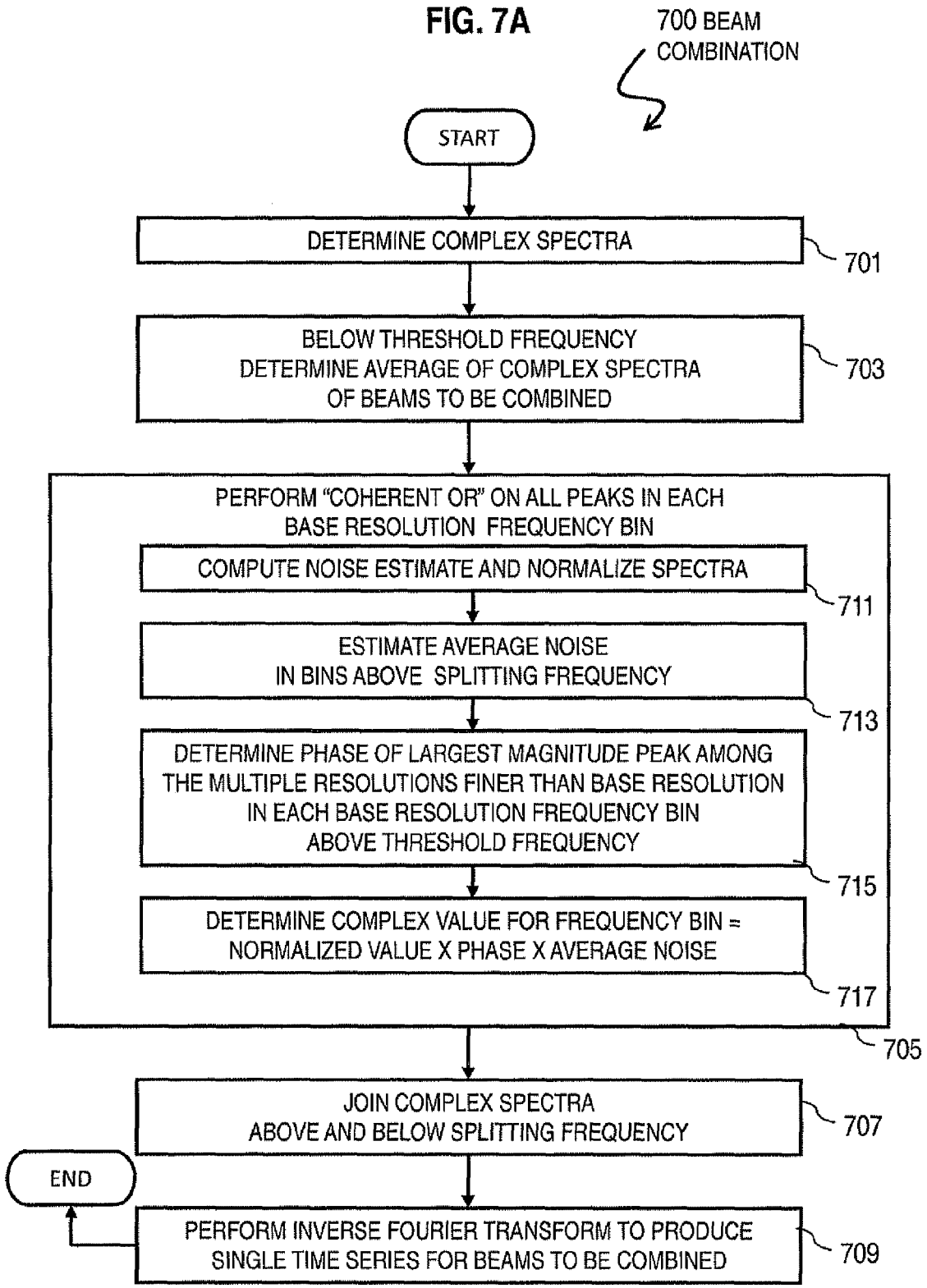

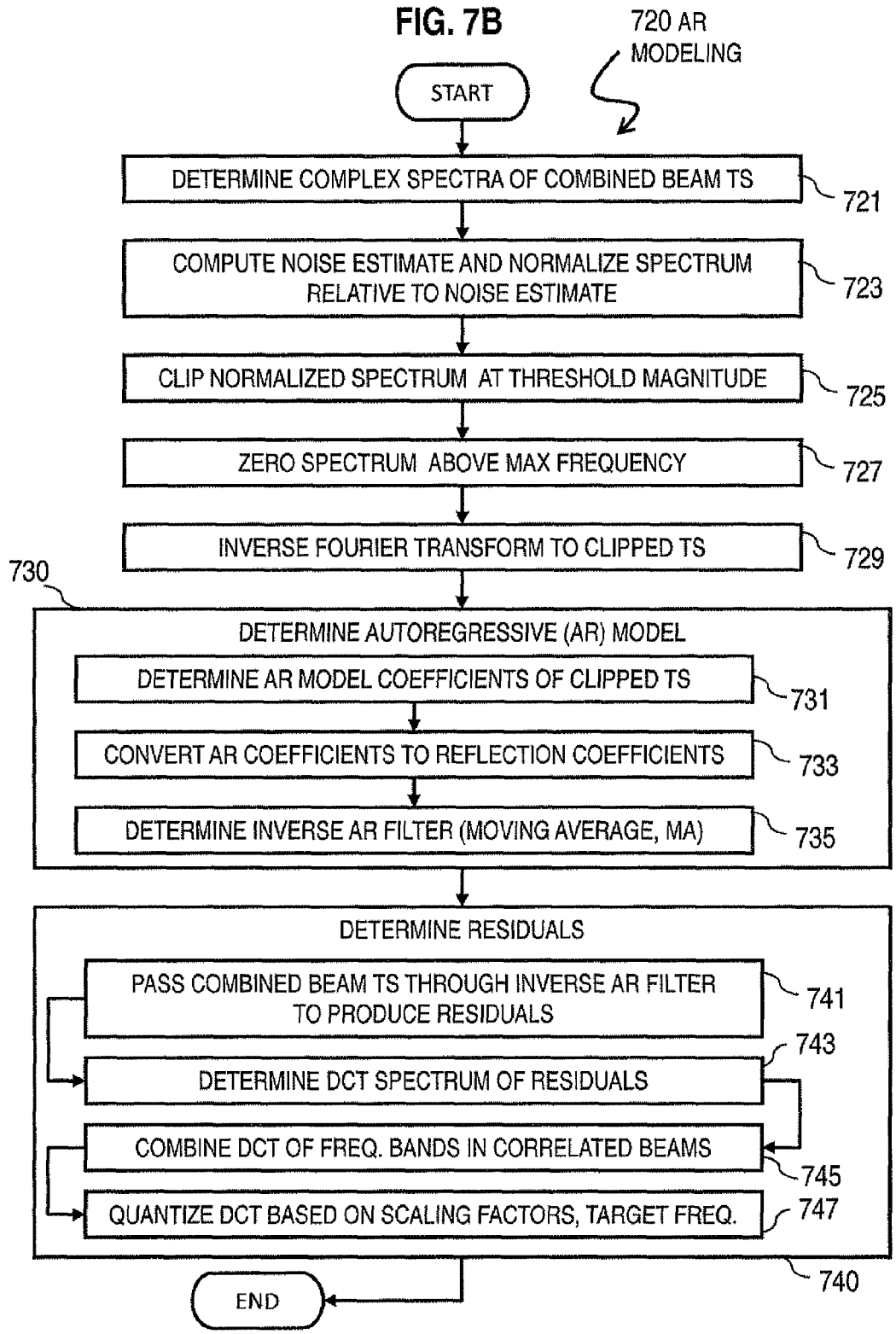

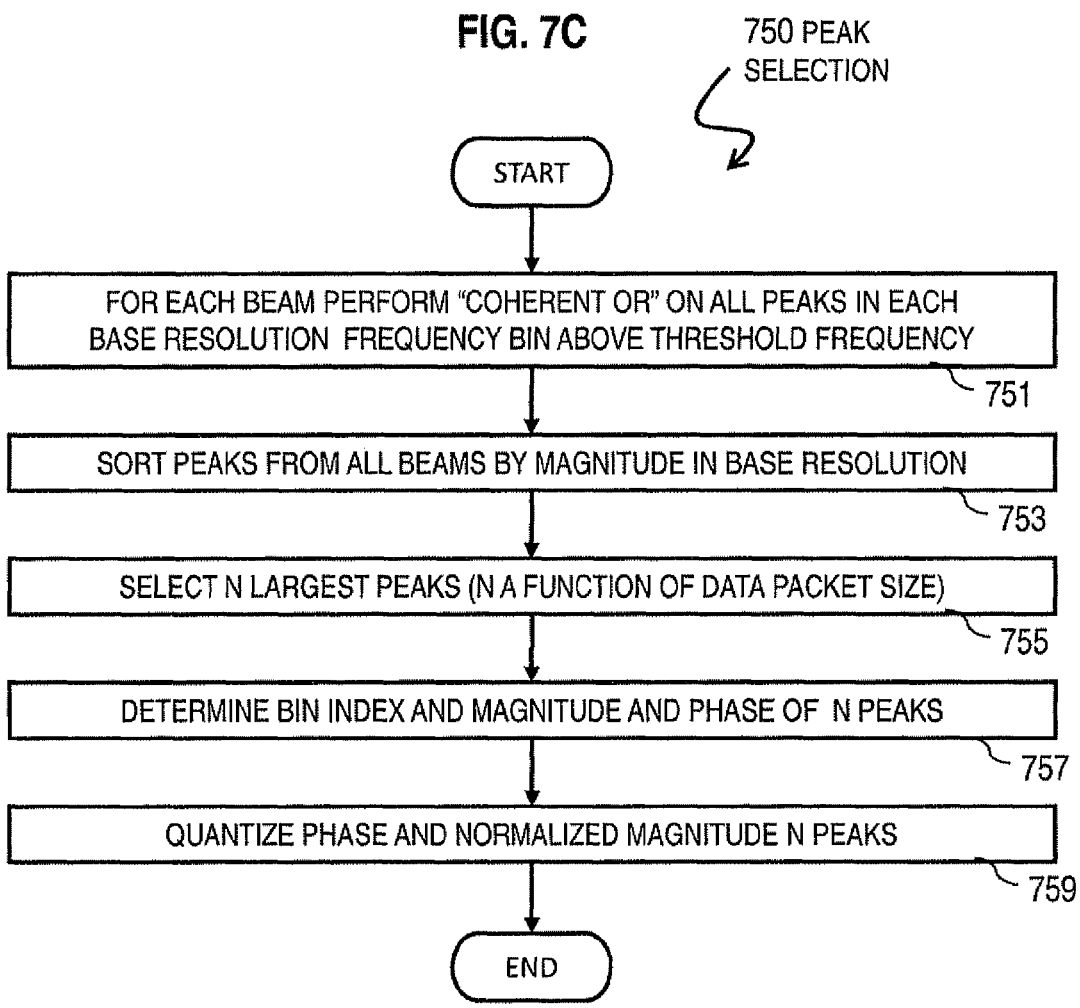

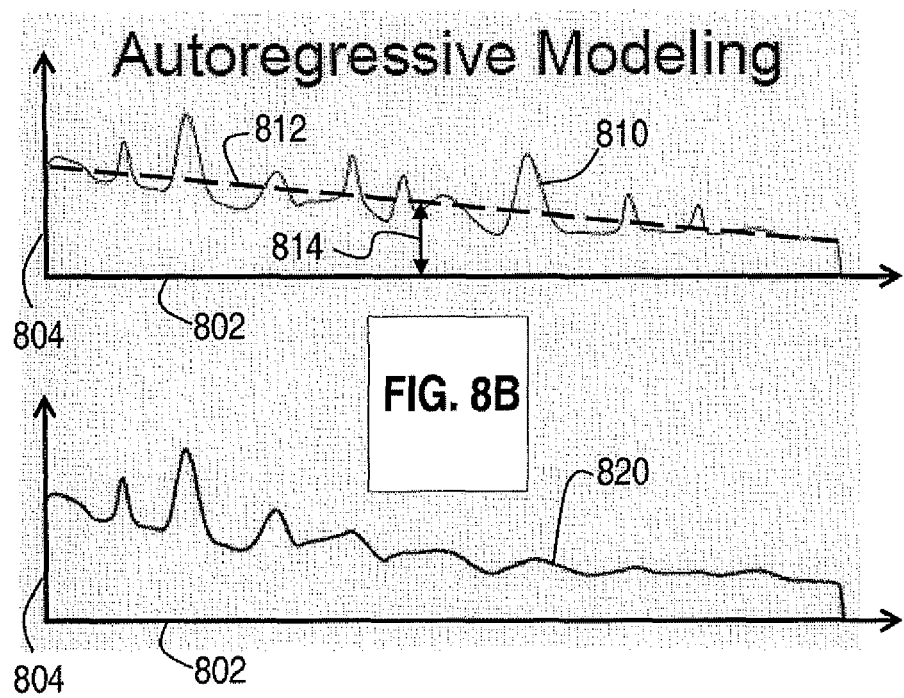
FIG. 8A
FIG. 8B
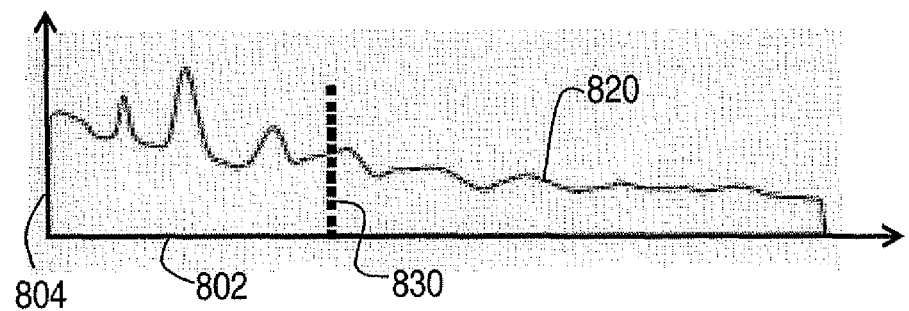
FIG. 8C
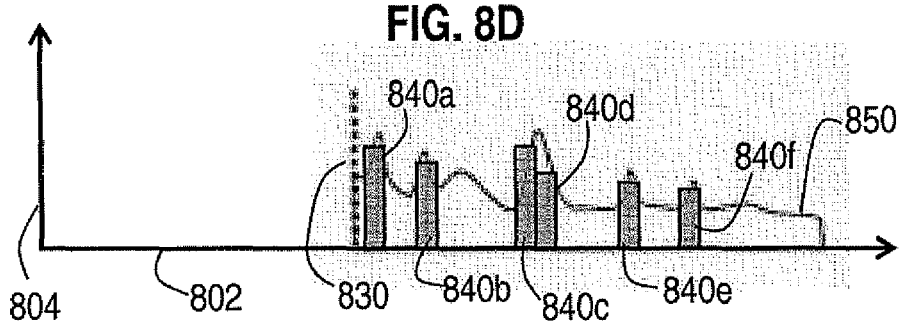
FIG. 8D

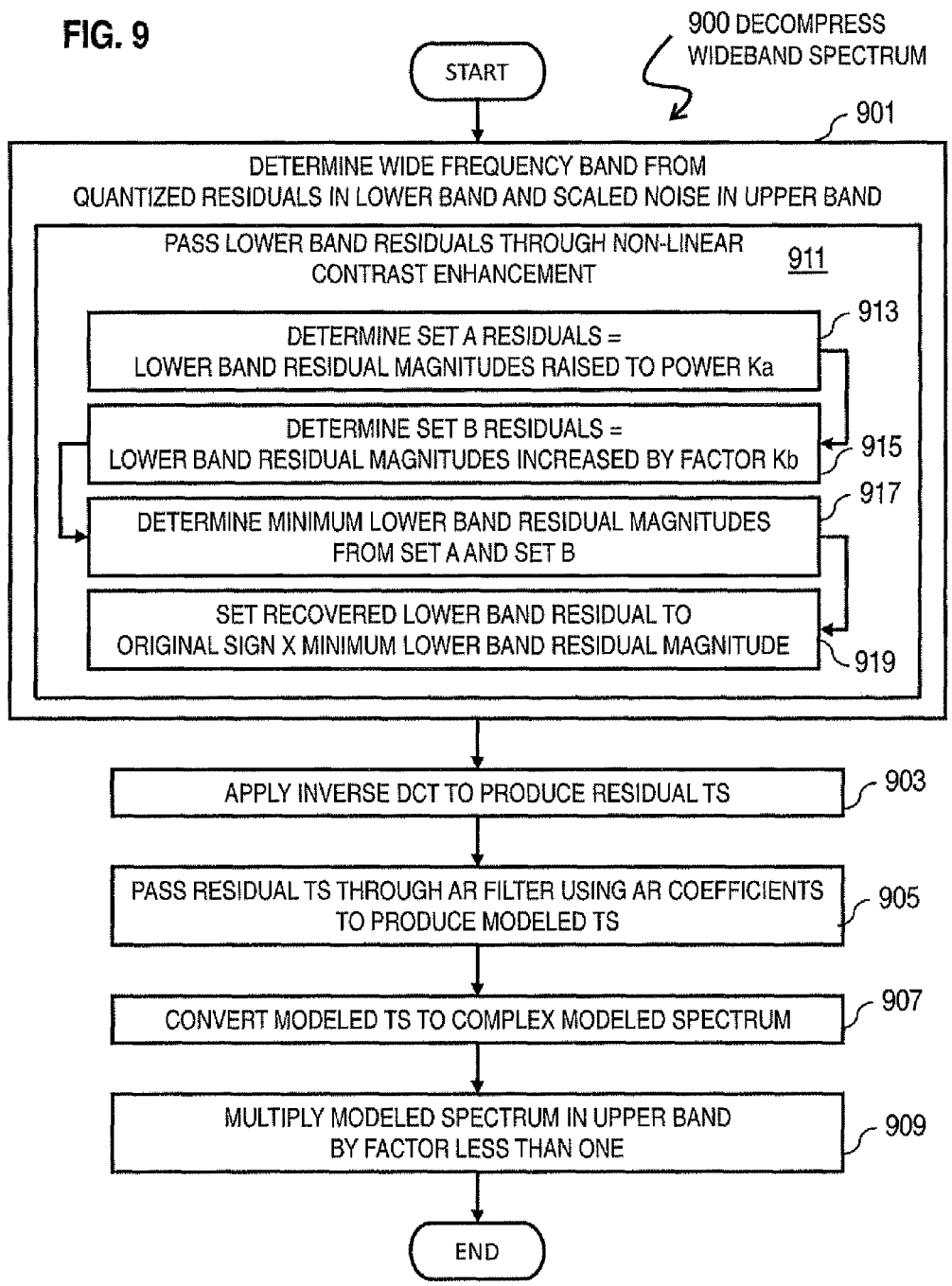

HIGH FIDELITY DATA COMPRESSION FOR ACOUSTIC ARRAYS

STATEMENT OF GOVERNMENTAL INTEREST

This invention was made with U.S. Government support under the Space and Naval Warfare Systems Command under contract number N0002403-D-6606. The U.S. Government has certain rights in the invention.

CROSS-REFERENCE TO RELATED APPLICATIONS

This application is related to prior filed Provisional Appln. 60/539,657 filed Jan. 28, 2004; Provisional Appln. 60/656,442 filed Feb. 24, 2005; and, Provisional Appln. 60/786,239 filed Mar. 27, 2006, the entire contents of each of which are hereby incorporated by reference as if fully set forth herein.

BACKGROUND OF THE INVENTION

1. Field of the Invention

The present invention relates to high fidelity acoustic data processing or compression.

2. Description of the Related Art

Directional acoustic data is useful for a wide range of applications from surveying underground structures to tracking bodies traveling underwater. This data usually comprises acoustic pressure measurements sampled to resolve acoustic frequencies between a few cycles per second (Hertz, Hz) to a few kiloHz (kHz, 1 kHz=$10^3$ Hz) along each of multiple directions of arrival, called beams. Multiple beams are detectable by one dimensional (1D), two dimensional (2D) and three dimensional (3D) arrays of acoustic sensors, called acoustic arrays herein. Sampling rates approach counts of pressure samples per second at twice the highest frequency for each beam. Since a pressure measurement usually involves about 8 binary digits (bits) of data for each of tens to hundreds of beams, data rates can exceed 100 megabits per second (Mbps, 1 Mbps=$10^6$ bits per second).

When the directional acoustic data is collected at remote sites, the data must be communicated to a processing station over a communications channel, such as a satellite communications channel, that might have a very limited bandwidth compared to the bandwidth of several hundred MegaHertz (MHz, 1 MHz=$10^6$ Hz) needed to carry such high data rates, Therefore, it is desirable to represent the important features of the directional acoustic data in less than the full data rate, a process called compression. An acoustic compression technique well known in the art that preserves the human-perceptible nuances of speech and music is the Moving Picture Experts Group (MPEG) Audio Layer III (MP3) format for audio data. MP3 can achieve a compression ratio (ratio of uncompressed data rate to compressed data rate) of about 7:1 or 8:1. For some applications, however, including some applications for directional acoustic data, the MP3 compression ratio is insufficient; and compression ratios of 16:1 to 24:1 and greater are desirable. However, the compressed data should preserve important features for acoustically detecting or characterizing objects such as subsurface structures and underwater bodies.

SUMMARY OF THE INVENTION

Techniques are provided for high fidelity processing or data compression for acoustic arrays.

In a first set of embodiments, a method includes determining coefficients of a complex auto regression (AR) model to fit a complex average spectrum at a base frequency resolution of a set of one or more measured acoustic beams during a time block. Residuals derived by filtering actual data through an inverse of the AR model are determined at frequencies below a first threshold frequency. A quantized spectrum of the residuals is determined at the base frequency resolution. Magnitude, phase, and frequency bin at the base frequency resolution are determined for each peak of a set of one or more narrowband peaks above a second threshold frequency for the set of one or more measured acoustic beams. A message is sent, which indicates without loss the quantized coefficients of the AR model, the quantized spectrum of the residuals, and the frequency bin, quantized magnitude and quantized phase for each peak of the set of one or more narrowband peaks.

In a second set of embodiments, a method includes receiving a message that indicates without loss quantized coefficients of an auto regression (AR) model, a quantized spectrum of residuals and a set of one or more narrowband peaks. The AR model fits a complex average spectrum at a base frequency resolution of one or more measured acoustic beams during a time block. The residuals indicate the difference between the model and the measured acoustic beams. Each peak of the set of one or more narrowband peaks is indicated by a frequency bin and magnitude and phase. A composite complex spectrum is determined based on the coefficients, the quantized spectrum of residuals, and, for each peak of the set of one or more narrowband peaks, frequency bin and magnitude and phase. An approximation of the average of the one or more measured acoustic beams during the time block is generated by determining an inverse Fourier transform of the composite complex spectrum.

In another set of embodiments, a method includes receiving data that indicates multiple spectra derived from one or more measured acoustic beams during a time block. A greatest magnitude and corresponding phase among the plurality of spectra is determined for a frequency bin encompassed by each bandwidth of the plurality of spectra. A combined spectrum is determined, which includes in the frequency bin of the combined spectrum an amplitude based on the greatest magnitude and a phase based only on the corresponding phase.

In another set of embodiments, a method includes determining coefficients of a complex auto regression (AR) model to fit a complex average spectrum at a base frequency resolution of a set of one or more measured acoustic beams during a time block. Residuals between actual data and the AR model are determined at frequencies below a first threshold frequency. An average spectrum of the residuals at the base frequency resolution is determined. A reduced noise spectrum is determined based on the average spectrum of the residuals multiplied by a first weight and the model fit multiplied by a second weight. The first weight is greater than the second weight.

In various other embodiments, an apparatus or logic encoded in tangible media or computer-readable media is configured to cause an apparatus to perform one or more steps of the above methods.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention.

Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is a block diagram that illustrates an example acoustic array data compression system, according to an embodiment;

FIG. 2 is a graph that illustrates a beam time series (BTS) in a time block, according to an embodiment;

FIG. 3 is a graph that illustrates a set of frequency spectra at multiple frequency resolutions for a BTS in a time block, according to an embodiment;

FIG. 4A is a flow diagram that illustrates at a high level a method for compressing acoustic array data, according to an embodiment;

FIG. 4B is a block diagram that illustrates a compression module, according to an embodiment;

FIG. 6A is a flow diagram that illustrates at a high level a method for decompressing acoustic array data, according to an embodiment;

FIG. 6B is a block diagram that illustrates a decompression module, according to an embodiment;

FIG. 7A is a flow diagram that illustrates a method for performing a beam combination step of the method of FIG. 4, according to an embodiment;

FIG. 7B is a flow diagram that illustrates a method for performing an autoregressive (AR) modeling step of the method of FIG. 4, according to an embodiment;

FIG. 7C is a flow diagram that illustrates a method for performing a peak selection step of the method of FIG. 4, according to an embodiment;

FIG. 8A through FIG. 8D are graphs that illustrate evolution of a complex spectrum during data compression and decompression, according to an embodiment;

FIG. 9 is a flow diagram that illustrates a method for performing wideband decompression steps of the method of FIG. 6, according to an embodiment;

DETAILED DESCRIPTION

Figure 5A:
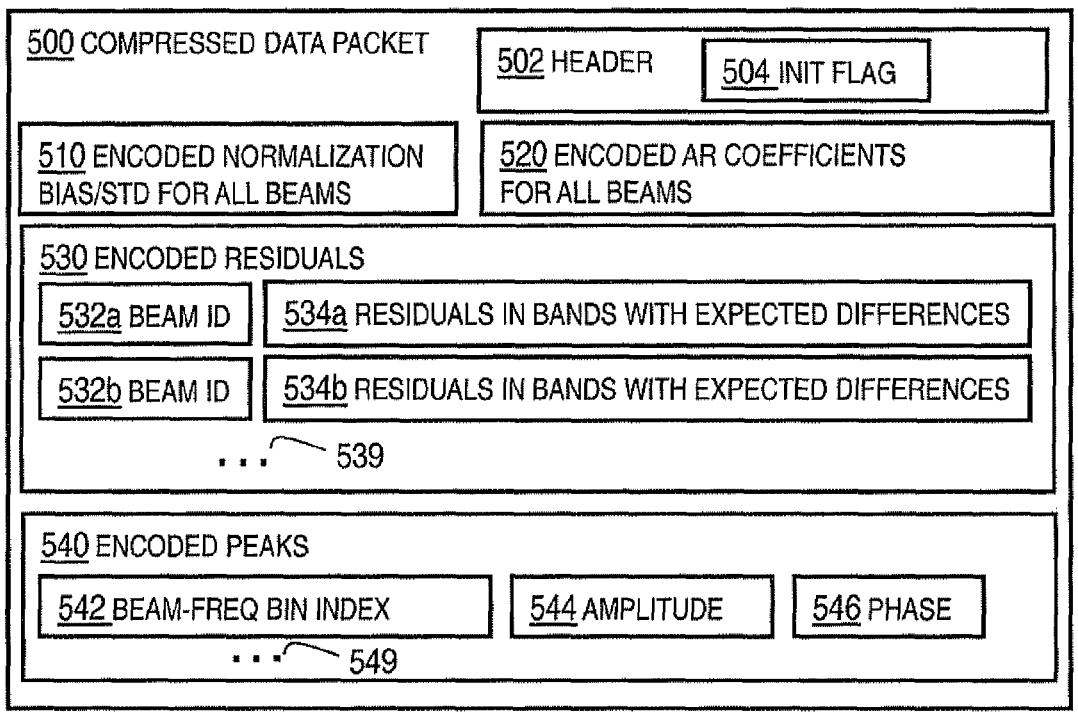
FIG. 5A is a block diagram that illustrates a compressed data packet of limited size, according to an embodiment.

Techniques are described for high fidelity compression of acoustic array data. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Some embodiments of the invention are described below in the context of remote acoustic arrays for passive detection and characterization of underwater bodies based on signals received on acoustic beams. However, the invention is not limited to this context. In other embodiments acoustic data representing acoustic beams or individual or grouped sensors is compressed for acoustic arrays using seismic, low frequency or ultrasound frequencies to actively or passively detect or characterize moving or stationary objects that are underwater, underground, behind an opaque surface or below skin, e.g., during mineral prospecting, or biological prospecting, or search and rescue, or navigation, or medical procedures, among other endeavors.

1. Overview

FIG. 1 is a block diagram that illustrates an example acoustic array data compression system 100, according to an embodiment. The system 100 includes an acoustic array 114 of two or more acoustic sensors 112 that feeds pressure measurements as a function of time to a processor/transmitter apparatus 116. The apparatus 116 transmits acoustic data to a processor/receiver apparatus 120 through one or more communications links, such as communication link 130 through satellite 132. Although depicted for purposes of illustration, the subsurface structure 190 is not part of system 100.

The apparatus 116 interprets the phased acoustic arrivals at displaced acoustic sensors 112 as acoustic pressure traces on each of one or more acoustic beams 118 for a known or assumed speed of sound in the medium. Each acoustic beam (also called simply a beam herein) is associated with sounds propagating to the array in a particular range of directions. The greater the number and dimensional extent of the acoustic sensors, the finer the beam angular resolution and the smaller the range of directions represented by a single beam, and the more different beams can be resolved. Sounds emanating or reflected from a body, e.g. subsurface structure 190, affect the acoustic signature on one or more beams 118.

The apparatus 120 is used to further process the data, e.g., with higher powered processors or in coordination with data from other remote acoustic arrays, not shown, to characterize the position or type, or both, of subsurface structure 190.

It is assumed for purposes of illustration that the communication link 130 does not have the bandwidth to carry all the data associated with acoustic beams 118 in real time, e.g., as fast as the data is collected. According to the illustrated embodiment, the compression module 142 in apparatus 116 extracts and preserves the most useful portion of the data associated with acoustic beams, compresses that information to fit in data packets that can be transmitted in real time (e.g., as fast as the data represented is collected), and sends those data packets for transmission over the communications link 130. According to the illustrated embodiment, the decompression module 144 in apparatus 120 decodes the received data packets and reconstructs the acoustic time series with the preserved features, also in real time.

In one embodiment, called the Passive Sonar Compression Algorithm (PSCA), signal analysis and synthesis is used to transmit the beam data in real time. PSCA analyzes the sonar signal, using the frequency spectra of the signal, and produces a small set of prioritized narrowband and broadband weights. The compressed information is transmitted over a limited bandwidth communication channel, and the transmitted weights are used to reconstruct the signal. The signal can then be processed in the same manner as if it were the original signal, at least for the features preserved by the analysis.

FIG. 2 is a graph that illustrates a beam time series (BTS) in a time block, according to an embodiment. The horizontal axis 202 indicates time increasing to the right. The vertical axis 204 indicates acoustic amplitude (e.g., pressure). A particular time interval, called a time block 210, is indicated. The time block is a time for which a piece of the acoustic signal is to be included in each data packet sent over the communications link 130.

A complex frequency spectrum indicates the magnitude and phase associated with each frequency, which can be used as a weighting factor and time argument, respectively, of a sine or cosine function of the same frequency. The complex spectrum spans multiple frequencies and can be used to reconstruct an arbitrary signal over a limited time to an arbitrary degree of accuracy. The complex spectrum can be determined from a time series using the Fourier Transform, well know in the art. An efficient method to determine a discrete complex spectrum at a finite number of frequencies is determined for a time series of values at discrete times using, for example, the Fast Fourier Transform (FFT), also well known in the art.

The frequency resolution of the spectrum (smallest frequency change over which changes of amplitude and phase are detectable) is no finer than the reciprocal of the temporal duration of the time series. Therefore a block of time to handle together (called a time block of duration $T_B$ hereinafter) is determined to be long enough to resolve the finest spectral features of interest for a particular purpose, called the finest frequency resolution, and represented by symbol $\Delta F_0$. For purposes of illustration it is assumed that a time block of $T_B = 8$ seconds (s) is sufficient to resolve features of interest, thus $\Delta F_0 = 1/T_B = 0.125$ Hz. Many features of interest are broader than the finest features of interest and can be observed in spectra with coarser frequency resolutions, e.g., at 0.25 Hz, 0.5 Hz and 1 Hz. A discrete spectrum includes a magnitude and phase (or corresponding complex values made up of a real part and an orthogonal imaginary part) for each frequency bin of width equal to the frequency resolution.

FIG. 3 is a graph that illustrates a set of frequency spectra at multiple frequency resolutions (called layers hereinafter) for a single BTS in a time block, according to an embodiment. The horizontal axis 302 is frequency, increasing to the right. The vertical axis 304 indicates amplitude (e.g., magnitude of the complex number), phase is not shown. To avoid obscuring each other, the three spectra are offset from each other by increasing frequency and amplitude amounts. In the example spectra depicted in FIG. 3, the features present are well represented by all three resolutions (layers)—no new peaks suddenly appear at a finer resolution. While no new peaks appear in the example illustrated, in general, new peaks might appear. Finer resolutions have the ability of pulling out weaker sinusoids and new peaks may thus appear. The frequency bandwidth 310 of the spectra is equal to the reciprocal of twice the finest temporal resolution of the data. For example embodiments in which the pressure time series of each beam is sampled about 80,000 times per second, the band width is about 40 kHz.

According to some embodiments, a base frequency resolution is selected that is able to indicate the presence of features of interest but is somewhat coarser than the finest spectral features of interest. It is found that frequency bins that are twice to four times the frequency width of the finest frequency feature can be used to indicate the presence of such features. It is assumed for purposes of illustration that the finest features of interest (e.g., narrowband peaks) are fully described by spectra with a 0.25 Hz resolution; so, a base resolution of 1 Hz is selected for these example embodiments. By using a coarser base resolution, the amount of data used to represent the whole spectrum is greatly reduced, and the few occurrences of the fine features are handled separately. Frequency analysis at finer resolutions than the base frequency resolution is possible by coherently integrating over a longer duration of time, e.g., over multiple concatenated blocks of data with size given by the inverse of the base frequency resolution.

2. Compression Methods

FIG. 4A is a flow diagram that illustrates at a high level a method 400 for compressing acoustic array data, according to an embodiment. Although steps are shown in FIG. 4A and subsequent flow diagrams FIG. 6A, FIG. 7A, FIG. 7B, FIG. 7C and FIG. 9 in a particular order for purposes of illustration, in other embodiments one or more steps or portions thereof are performed in a different order or overlapping in time, in series or parallel, or one or more steps are omitted or other steps are added, or the methods are changed in some combination of ways.

In step 401, data is retrieved which indicates parameters that describe certain properties of the method, such as the base frequency resolution, the time block duration (which defines the finest frequency resolution), the communication link data rate (which determines how much the data must be compressed) and other properties described in more detail below. Any method may be used to retrieve this data, including receiving the data passively. For example, the data may be read from a read only memory (ROM) or other non-volatile storage in the device that implements the method. For example, in various embodiments, the data is included as a default value in software instructions, is received as manual input from a system administrator on the local or a remote node, is retrieved from a local file or database, or is sent from a different node on a communications network, either in response to a query or unsolicited, or the data is received using some combination of these methods.

In various embodiments, other parameters include: identifying an algorithm to use to derive autoregressive (AR) model coefficients; identifying an algorithm to losslessly encode arrays of integers; frequency bands on multiple beams that are correlated and need not be reported separately; the number of beams to combine a priori that need not be separated by the decompression module; scaling factors to convert floating point numbers to integers (quantization); a splitting frequency between a lower band and an upper band treated differently; the percent of the data packet to devote to describing low band features; the maximum number of narrowband peaks to describe features in the upper band; and, a clipping magnitude to condition a spectrum for AR modeling, among others.

In some embodiments, the cutoff between the lower and upper bands is dependent on signal density knowledge and transmission bandwidth considerations. With respect to signal density, for underwater applications the majority of signals are found in the lower frequencies due to larger transmission losses associated with higher frequency signals. A high quality method (residual encoding) is used to save the lower frequency data, while a highly compressive method (narrowband peak selection) is used to retain signals that appear in the upper frequencies. With respect to communication bandwidth considerations, lower band coding uses up communications link bandwidth in a manner that is directly proportional to the splitting frequency. If a large communications bandwidth exists, then the splitting frequency can be pushed higher to save a higher percentage of data with lower band coding. For lower communications link bandwidths, the splitting frequency can be set to lower values.

In some embodiments, various parameters are derived automatically from other parameters or the data itself. For example, spectra from various beams are correlated in various frequency bins to determine the frequency bins of correlated spectra that can be combined during compression. The splitting frequency is determined based on the number of narrowband peaks and accuracy of the wideband modeling achieved in past performance. The uses of these parameters are described in more detail with reference to the following steps described in this and subsequent flow diagrams.

In step 403, beam time series (BTS) data is received for one or more beams. Converting acoustic sensor data to beam time series data is well known in the art and any method may be used that is known when embodiments are implemented. In some embodiments, step 403 includes determining whether to initialize or re-initialize one or more parameters of the algorithms based on the data being received, e.g. due to a gap in the data or a change in one or more signal levels.

In step 405, the BTS for each beam is sampled in a single time block. In preparation for computing a complex spectrum, the BTS time block is sampled using a windowing function (e.g., with a Hamming window or Hanning window or any other windowing function well known in the art) to taper the beginning and end of the time block, which reduces leakage of energy into different frequency bins. The complex spectrum is then computed for several different frequency resolutions (layers) including the base resolution and one or more finer resolutions for each beam. The amplitudes are corrected for the known effects of the windowing function.

In step 407 multiple beams are combined a priori that will not be recovered on decompression. This provides an immediate M:1 compression ratio, where M is the number of beams combined a priori. The step involves averaging complex spectra below the splitting frequency and selecting the largest narrowband peaks above the splitting frequency, as described in more detail below with reference to FIG. 7A. The selected narrowband peaks are combined at the base frequency resolution using coherent ORing developed for this purpose, and also described in more detail below with reference to FIG. 7A. In some embodiments, M=1 and step 407 is omitted. As used here, remaining beams refer to one or more beams that remain after the a priori M:1 combination of beams performed in step 407.

In step 409, a wideband model of the complex spectrum at the base resolution is determined for each beam. The wideband model includes normalization parameters (e.g., bias and standard deviation of the complex spectrum), an autoregressive (AR) model to provide the impulse response, and residuals that combine with the impulse response to regenerate the time series below the splitting frequency. While autoregressive models are well known, they have not before been used with residuals to compress a portion of a spectrum below a splitting frequency separately from treatment above the splitting frequency. AR modeling is described in more detail below with reference to FIG. 7B.

In step 411 the model coefficients are converted to integers (quantized) and the residuals are combined for correlated frequency bands, if any, in multiple beams. The combined residuals below the splitting frequency (lower frequency band) are determined based on their discrete cosine transform (DCT) to the frequency domain. The retained transformed residuals are also quantized in step 411, and described in more detail below with reference to FIG. 7B.

In step 413, the N greatest narrowband peaks above the splitting frequency (i.e., in the upper frequency band) for all remaining beams (after a priori combination) are determined and converted to the base frequency resolution and associated bins using coherent ORing, as described below with reference to FIG. 7C. The frequency bin number (indicating both the beam and frequency bin) amplitude and phase are quantized to integers for each peak.

In step 415, the quantized model coefficients, normalization parameters, residuals and peaks are losslessly encoded in a data packet of limited size. The data packet size can be the size limit or smaller. The size is limited by the product of the communications bandwidth ($B_C$) and the time block ($T_B$) and the communications protocol overhead for real time applications. For example, for $B_C$=1 Mbps and TB=8 s, the size limit is about 8 Megabits (Mb, 1 Mb=$10^6$ bits) or 1 Megabyte (MB, 1 MB =$10^6$ bytes, 1 byte=8 bits) less any communications protocol overhead.

Any lossless encoding may be used in step 415. In an example embodiment, Huffman encoding, well known in the art is used (see for example, Huffman, D. A. [1952]. "A Method for the Construction of Minimum Redundancy Codes." Proc. IRE, vol. 40, no. 10, pp. 1098-1101, the entire contents of which are hereby incorporated by reference except for terminology that is inconsistent with that used herein). In an example embodiment, the quantized residual DCT values are coded with the Huffman encoder that optimizes lengths of the code words that represent symbols based on the probability of the symbols occurring. The narrowband peak indices are coded with a difference encoder. The AR model coefficients from beam to beam are coded with a difference encoder.

In step 417, the limited length data packet is sent over the communications link within one time block. The constraint for real time communication of acoustic array data is important for ongoing monitoring embodiments. In other embodiments of short term measurements, packets with a larger size limit may be used, and the packet can be sent in a time duration in excess of the time block. The data packet may be sent as one message packet over the communications link or as multiple message packets, as dictated by the communications link protocol. The communications protocol overhead data reduces the size of the data packet available for compressed acoustic data. For example, for communications protocols that involve a 10% overhead (header size to payload size), the size limit is reduced by 10%, e.g., to about 7.2 Mb.

Control passes back to step 405 and following to process and send the next time block of BTS data for all beams. In some embodiments, the execution time for steps 405 through 417 is excluded from the time to transmit the compressed data from one time block. If it is assumed for example that steps 405 through 417 can be accomplished within ten minutes, then the communication of compressed data is delayed by 10 minutes, but sufficient parallelization can keep up with the data sampling rate and does not fall father behind. In other embodiments, the processing time is also limited and further limits the time to send the data packet. For example, if the data packet is to be sent within the 8 seconds, and if the processing time is 2 seconds, then the size limit is the communications bandwidth ($B_C$) times the difference, e.g. 6 seconds. This may require extremely powerful and expensive parallel processors in the remote processor/transmitter apparatus 116 to accomplish the processing within 2 seconds.

3. Structural Elements

Figure 10:
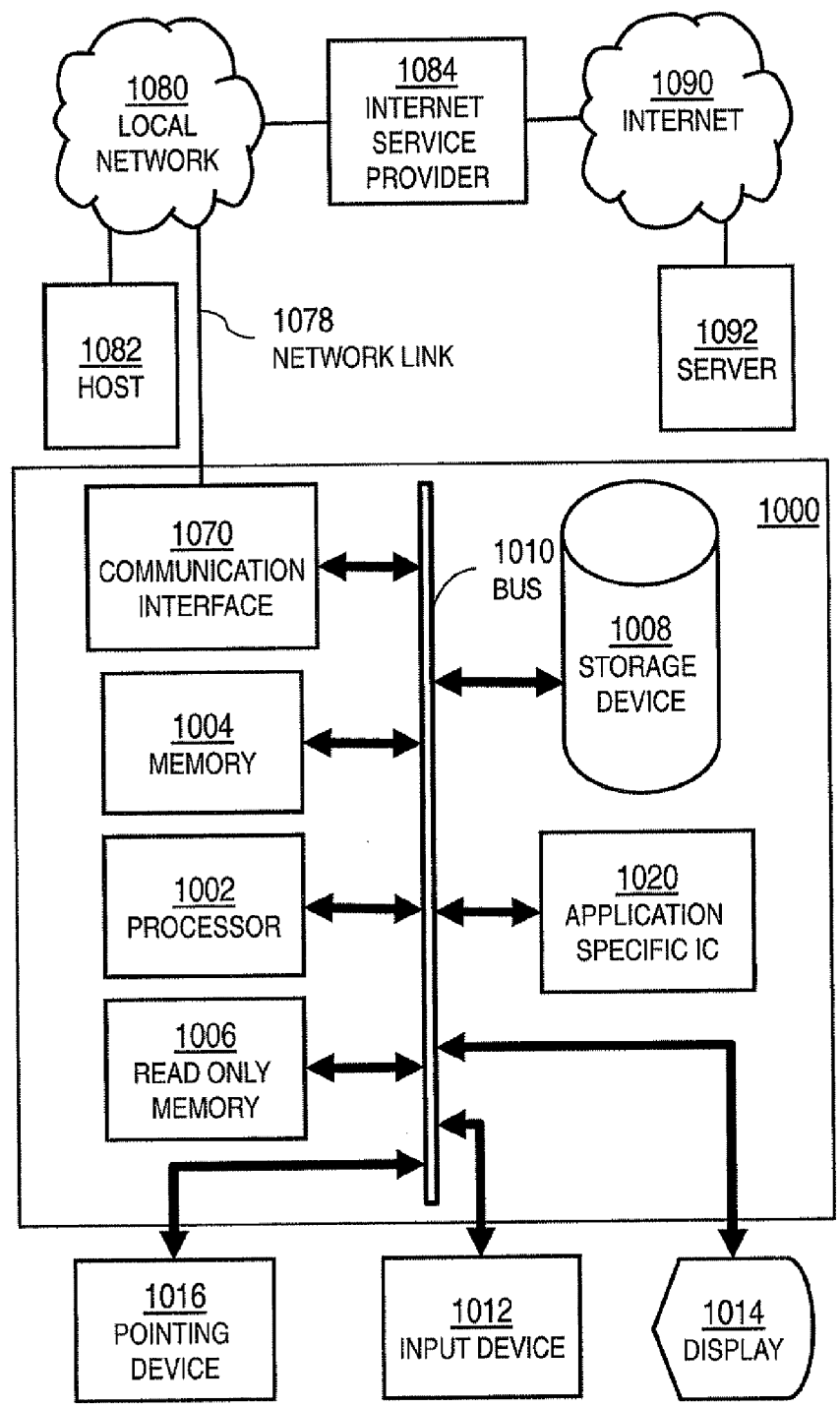
FIG. 10 is a block diagram that illustrates a computer system upon which an embodiment of the invention may be implemented.

FIG. 4B is a block diagram that illustrates a compression module 420, according to an embodiment. Compression module 420 is a particular embodiment of compression module 142 depicted in FIG. 1 The compression module 420 receives beam time series (BTS) streams of data 480 and outputs limited sized data packets 488a and 488b, collectively referenced hereinafter as limited size data packets 488. The module may be implemented on a general purpose computer as depicted in FIG. 10 or in one or more chip sets depicted in FIG. 11, both described in more detail below. Data is carried between physical modules by one or more fast parallel buses that transmit many bits of data per clock cycle for the module 420.

Data shared between the compression module 420 and a decompression module, e.g., decompression module 144, are held in shared data data structure 422, This data is received or exchanged in a different communications link or time than the use of communications link 130 for transmitting limited sized packets 488. The data in shared data structure 422 includes all parameters used for the various algorithms implemented in the other modules, such as described above with reference to step 401.

The BTS streams are carried by a bus to a preprocessing module 430 where data are buffered in a storage component until a blocksize is reached, which is adequate to hold data from all beams for the time block. Based on the data, a determination is made whether to initialize or re-initialize one or more parameters of the algorithms. The complex spectrum is computed for multiple frequency resolutions (layers) including the base resolution. In some embodiments, M beams are combined a priori in beam combination module 432.

Output from module 430 is input to module 440 where AR modeling and model coefficient quantizing is performed. The wideband output from the AR modeling module is input to a residual coding module 442 and a frequency band splitting module 450. The frequency band splitting module sends the upper frequency band data to the peak selection module 460 and the lower frequency band data to the residual coding module 442. The residual coding module 442 uses the AR model coefficients to determine and quantize the residual DCT spectrum for the lower frequency band.

The peak selection module 460 determines and quantizes the base resolution frequency bin, amplitude and phase of the N largest peaks among all beams based on the multiple spectra layers and the wideband model.

The quantized (e.g., integer) output from the AR modeling module 440, residual coding module 442, and peak selection module 460 are input to the packet encoding module 470 that losslessly encodes the quantized values into a limited sized packet 488. The processor/transmitter apparatus 116 then transmits the limited sized packet 488 over the communications link 130.

In some embodiments, an application programming interface (API) 424 is used to invoke compression module 420 from other modules or applications, exchange one or more values of the shared data, pass the beam time series streams 480 into the module, and return the limited sized packets 488.

Although particular data structure and sub-module components are shown in FIG. 4B, and subsequent diagram 6B, as integral blocks in a particular arrangement for purposes of illustration, in other embodiments, one or more data structures or sub-modules or portions thereof may be distributed across multiple devices or chip sets to be invoked in series or parallel, or one or more components are omitted or additional components added, or the module is changed in some combination of ways.

FIG. 5A is a block diagram that illustrates a compressed data packet 500 of limited size, according to an embodiment. This packet 500 is carried in the payload of one or more message packets of a communications link protocol. The packet includes a header field 502, encoded normalization field 510, an encoded AR coefficients field 520, an encoded residuals field 530 and an encoded peaks field 540.

Although fields are depicted in data packet 500 as integral blocks in a particular order for purposes of illustration, in other embodiments one or more fields or portions thereof may be combined or arranged in a different order.

The header field 502 holds data that indicates any change to the shared data and includes an initialization flag field 504. The initialization flag field 504 indicates when the parameters of an algorithm or properties of the lossless encoding are to be initialized or re-initialized. For example, some encoding works by sending differences from previous or standard values, and on occasion the initial or standard value has to be reset. The data in the initialization flag indicates which parameters or values are being reset. For example, the initialization flag is simply used to force a hard reset in the case that buffers and parameters are desired to be reset.

In various embodiments header field 502 also includes one or more fields indicating one or more of the following: 1) Algorithm version flag (indicates which version of the compression algorithm to use); 2) Length of data packet value; 3) Quality index value (which offers a measure of expected quality of the compressed data); 4) Process type value (to denote which set of parameters to load based on the type of array and the mode of operation); 5) Combination factor value (indicates factor of beam combination to use); 6) Force reset flag (as indicated above); 7) Channels (i.e. beams) to process flag (indicates which beams are to be processed, either the full set of beams or a partial set of beams); 8) Transmission data rate ID (to indicate the band of transmission data rates that algorithm is operating in currently).

The encoded normalization field 510 holds losslessly encoded data that indicates bias and standard deviation values determined during normalization for each remaining beam. The encoded AR coefficients field 520 holds losslessly encoded data that indicates AR model coefficients that depict the impulse response of each remaining beam.

The encoded residuals field 530 includes a beam identifier (ID) field 532*a*, beam ID field 532*b* and others indicated by ellipsis 539, collectively referenced hereinafter as beam ID field 532. The encoded residuals field 530 includes a residuals field 534*a*, residuals field 534*b* and others indicated by ellipsis 539, collectively referenced hereinafter as residuals field 534. The beam ID field holds data that indicates a remaining beam for which residuals are included. The residuals field 534 holds data that losslessly indicates residuals in one or more frequency bands where the residuals are expected to be different from the residuals in the same frequency bands on other beams. The correlated frequency bands where residuals are expected to be similar, are predetermined and stored in the shared data structure for both the compression module and decompression module. In effect, this operation removes some redundancy.

The encoded peaks field includes a beam-frequency bin index field 542, amplitude field 544 and phase field 546 for each of up to N narrowband peaks, as indicated by ellipsis 549. The beam-frequency bin index field 542 holds losslessly encoded data that indicates which base resolution frequency bin includes a narrowband peak. The corresponding amplitude field 544 holds losslessy encoded data that indicates the amplitude for the bin (to be added to the modeled noise) and the phase field 546 holds losslessly encoded data that indicates the phase of the peak. Any method may be used to indicate the amplitude and phase, including real and complex parts of a complex number representing sine and cosine functions at the frequency.

Figure 5B:
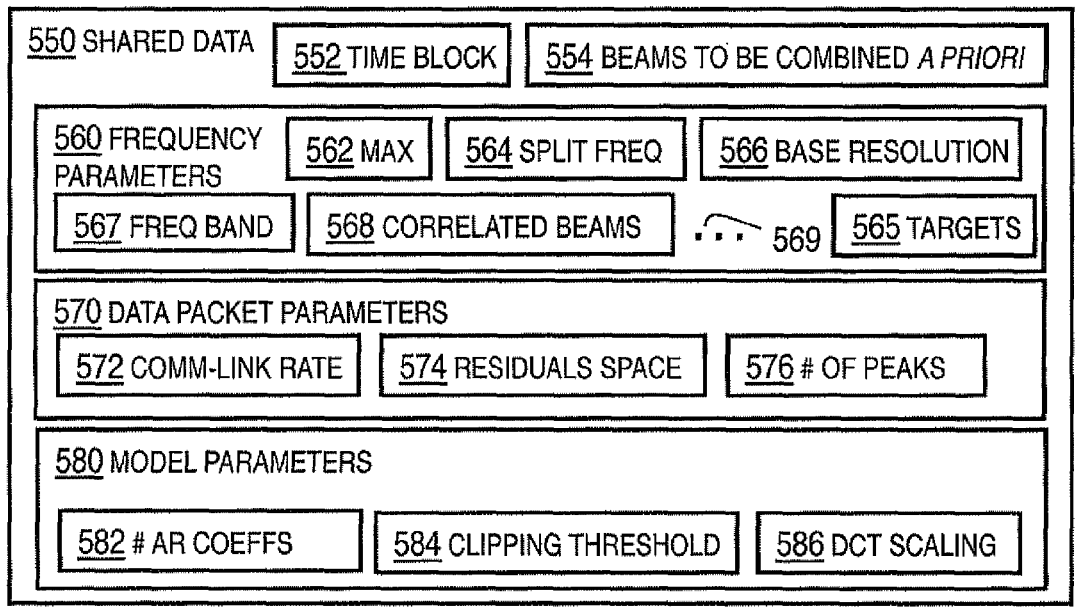
FIG. 5B is a block diagram that illustrates a data structure for shared data between a compression module and a processor module, according to an embodiment.

FIG. 5B is a block diagram that illustrates a data structure 550 for shared data between a compression module and a decompression module, according to an embodiment. The data structure 550 includes a time block field 552, beams to be combined field 554, frequency parameters field 560, data packet parameters field 570, and model parameters field 580.

The time block field 552 holds data that indicates the duration of each time block (e.g., 8 s). The beams to be combined block 554 holds data that indicates the number M of beams to be combined a priori.

The frequency parameters field 560 includes a max frequency field 562, a split frequency field 564, a base resolution field 566, a target field 565, and for each beam with expected correlated portions of the complex spectra a frequency band field 567 and a correlated beams field 568, for one or more additional frequency bands indicated by ellipsis 569.

The max frequency field 562 holds data that indicates the maximum frequency of a processing range of interest for wideband applications, e.g., 1000 Hz and below for some underwater applications. The split frequency field 564 holds data that indicates the splitting frequency to divide the upper band from the lower band for separate processing, e.g., 100 Hz for some applications. In some embodiments the max frequency and the splitting frequency are the same, and field 562 is omitted. The base resolution field 566 holds data that indicates the base frequency resolution, e.g., 1 Hz. The targets field 565 holds data that indicates the frequency ranges where lower band features are of special interest, if any, for deciding which residual DCT amplitudes to quantize.

The frequency band field 567 indicates a frequency range in the lower band where correlation among adjacent beams is expected to be high and redundant data can be excluded. The correlated beams field 568 holds data that indicates beam IDs for beams that are highly correlated in the associated band indicated in field 567.

The data packet parameters field 570 includes a communications link rate field 572, a residuals space field 574 and a number of peaks field 576. The communications link rate field 572 holds data that indicates the available bandwidth over the communications link, excluding communications protocol overhead, this information is used to determine the size limit for the limited sized data packets, as described above. The residuals space field 574 holds data that indicates how much of the limited sized packet is to be used for the residuals. In some embodiments, this information is expressed as a percentage, e.g., 70%. The number of peaks field 576 indicates the number N of peaks, each with corresponding bin index, amplitude and phase, which can be fit in the limited sized data packet. In some embodiments, this information is expressed as a percentage of the size limit, e.g., 20%.

The model parameters field 580 includes a number of AR coefficients field 582, a clipping threshold field 584, and a DCT scaling field 586. The number of AR coefficients field 582, holds data that indicates the number of AR coefficient that are allowed to model each beam spectrum, i.e., order of the AR model, and still fit in the fixed size data packet. The clipping threshold field 584 holds data that indicates a clipping threshold used after normalization to condition the beam spectrum for AR modeling, as described in more detail below. The DCT scaling field 586 holds data that indicates how to scale the DCT spectral values of the residuals to quantize them before encoding. In some embodiments, other scaling factors are included in the model parameters field 580 or other fields of the shared data data structure 550.

Although fields are depicted in shared data data structure 550 as integral blocks of a single data structure in a particular order for purposes of illustration, in other embodiments one or more fields or portions thereof may be combined or arranged in a different order in one or more data structures or databases on one or more devices, or one or more fields are omitted, or one or more fields are added, or the data structure is changed in some combination of ways.

4. Decompression Methods

FIG. 6A is a flow diagram that illustrates at a high level a method 600 for decompressing acoustic array data, according to an embodiment. These steps are performed by a decompression module, e.g., module 144 on a general purpose computer depicted in FIG. 10 or one or more chip sets depicted in FIG. 11.

In step 601, parameter settings are retrieved, as described above for step 401 in the compression module 142. In step 603, a limited sized data packet is received with encoded model coefficients, normalization values, residuals and peaks. In step 605, the encoded values are extracted from the data packet. In step 607, it is determined if the data packet indicates initialization or re-initialization of algorithm or encoding parameters. If so, then in step 609 buffers and other affected settings are initialized or re-initialized.

In step 611, the encoded values are decoded by applying the inverse encoding procedures. In step 613 a complex spectrum is generated for each beam based on the normalization, AR model and residuals as described in more detail below with reference to FIG. 9. In step 615 the narrowband peaks are added to the complex spectrum within the upper frequency band.

In step 617, an inverse Fourier transform (e.g., an inverse fast Fourier transform, IFFT) is applied to the complex spectrum to generate a beam time series (BTS) for each remaining beam.

In step 619, the BTS is appended to the BTS of corresponding remaining beams at previous time blocks. Control then passes to step 603 to receive the next limited sized data packet.

For real time output, it is desirable that each set of BTS time series is output every time block. It is acceptable for the process of steps 603 through 619 to take longer than that for the first time block as long as successive time blocks are output within the time block. This can be ensured with sufficient parallel processing capability. If it is assumed for example that steps 603 through 619 can be accomplished within two minutes, then the communication of BTS is delayed by these additional two minutes, but keeps up with the data sampling rate and does not fall father behind. Combining with execution time for compression, a BTS for each remaining beam is output every time block 12 minutes after the time block is received at the compression module and still satisfies the real time constraint.

FIG. 6B is a block diagram that illustrates a decompression module 620, according to an embodiment. Decompression module 620 is a particular embodiment of decompression module 144 depicted in FIG. 1 The decompression module 620 receives limited sized data packets 488a and 488b, and outputs reconstructed beam time series streams 680 for all remaining beams. The module 620 may be implemented on a general purpose computer as depicted in FIG. 10 or in one or more chip sets depicted in FIG. 11, both described in more detail below. Data is carried between physical modules by one or more fast parallel buses that transmit many bits of data per clock cycle for the module 620.

Data shared between the compression module 420 and the decompression module, 620 are held in shared data data structure 622. This data is received or exchanged in a different communications link or time than the use of communications link 130 for transmitting limited sized packets 488. The data in shared data data structure 622 includes all parameters used for the various algorithms implemented in the other modules, such as described above with reference to step 401 and step 601.

The limited sized data packets 488 are carried by a bus to a preprocessing and disassembling module 630 where parameters are initialized and data is buffered until a full data packet is received. The output is passed to the packet decoding module 670 where the lossless encoding performed in the compression stage is decoded. The narrowband peak information is passed to a peak insertion module 660; and the AR model coefficients, normalization data, and residual DCT amplitudes are passed to a wideband modeling module 650. The reconstruct spectrum module 652 reconstructs the complex spectra from the wideband spectra and the narrowband peaks for the remaining beams. The conversion time series module 640 generates a time series for each remaining beam, e.g., by applying an IFFT to the reconstructed complex spectra from module 652.

In some embodiments, an application programming interface (API) 624 is used to invoke decompression module 620 from other modules or applications, exchange one or more values of the shared data, pass the limited sized packets 488 into the module, and return the reconstructed beam time series streams 680.

These methods keep the general data shape using autoregressive (AR) modeling. A hybrid approach breaks data into a lower and an upper frequency band based on the following observations: most of the signals are in the lower band; and most of the data in the upper band is noise. In the lower band the entire spectrum is kept by coding the AR model residuals. High quality is maintained over the entire lower band at the cost of less compression. In the upper band high amplitude narrowband signals are kept by peak-picking. The AR model is able to model the rest of the information (non-narrowband signals). These methods maintain narrowband signals over a wide frequency band with low bits/Hz ratio. Lossless encoding of quantized information from both bands attains a higher compression rate. Contrast enhancement and noise reduction are also invoked to improve perceptual performance, as described in more detail below.

5. Detailed Methods

FIG. 7A is a flow diagram that illustrates a method for performing a beam combination step 407 of the method of FIG. 4, according to an embodiment. In step 701 a complex spectrum is computed for several frequency resolutions (layers) at every beam. In step 703 M beams are averaged together at the base frequency resolution for all frequency bins below the splitting frequency. This M-to-1 non-coherent averaging is performed to remove large noise spikes and take advantage of high correlation across adjacent beams at low frequencies.

In step 705 coherent ORing is performed on all peaks in each base resolution frequency bin above a particular frequency, such as the splitting frequency, as described in more detail below. In step 705 the complex spectra below the splitting frequency is joined to the coherently ORed peaks above the splitting frequency. Both stages return normalized data and phase angles. They are combined with an M-to-1 averaged noise estimate via a standard averaging operation. The result is beam frequency data that has been reduced in the number of beams by M-to-1. In step 709 an inverse Fourier transform (such as an IFFT) is performed to produce a single time series that represents all M combined beams. Thus, the processed data is converted back to the time domain to achieve the desired M-to-1 coherent beam reduction of the input BTS data.

In the illustrated embodiment, step 705 includes steps 711, 713, 715 and 717. Multi-resolution narrowband peaks are ORed along narrowband bins down to the base frequency resolution. Peak picking over the ORed narrowband data for all base resolution upper band frequency bins selects the maximum values. The indices of the maximum values are used to index into the unwindowed frequency data to select the strongest signals over all resolutions and beams. Unwindowed frequency data is raw times series data converted to the frequency domain with a Fourier transform. No tapering window, such as a Hamming or Hanning window, is applied to time series prior to the Fourier transform operation.

In step 711, an estimate of background noise in the upper band is computed and the spectra are normalized relative to the background noise estimate. This step is included in an attempt to remove the spectral color of the background noise from the spectra; in effect, this step is a background noise whitening process. Any normalization procedure known in the art may be used (see for example, Waite, A, D., Sonar for Practicing Engineers, John Wiley & Sons, pp. 131, 2002; and Nielsen, R. O., Sonar Signal Processing, Artech House Publishers, pp. 145-146, 1991, the entire contents of each of which are hereby incorporated by reference except for terminology that is inconsistent with that used herein). The normalization process first produces an estimate of the background noise by replacing narrowband-like features with local noise estimates at the respective positions. Then, normalized data is computed as the magnitude of the frequency data divided by the noise estimate.

In step 713 an average noise estimate is determined for bins above the splitting frequency by performing M-to-1 averaging of spectral noise estimates computed by the normalization procedure described above.

In step 715, phase angles for M-to-1 combined frequency data are computed. First, for each M-to-1 combined base resolution frequency bin, an index I is selected as being the index of the largest magnitude peak in each base resolution frequency bin among the M-beam blocks of ORed multi-layer data. Then, the phase angle for each base resolution frequency bin is set to the phase angle of the base resolution frequency data at I.

In step 717, the complex value for the M-to-1 combined base resolution frequency bin I is the product of the phase angle at I times the normalized value at I times the average noise estimate for the bin. This is done to choose which original frequency bin to keep among those in the M-beam block and combine it with the average noise estimate for the bin so as to avoid doing any further signal modification to the data. Thus, features in the finer resolution data can be recovered in this manner when coherent time integration is applied on the decompressed data.

FIG. 7B is a flow diagram that illustrates a method 720 for performing an autoregressive (AR) modeling for steps 409 and 411 of the method 400 of FIG. 4, according to an embodiment.

In step 721 the complex spectrum of each remaining beam (=M-combined beams) is determined, e.g., by taking the FFT of the time series of each remaining beam.

In step 723 the spectrum is normalized to produce normalized spectral data relative to the noise estimate. Spectral normalization produces normalized data relative to the spectral noise estimate as described for step 711. (Note: in some applications, normalization removes a mean value and divides the differences by a maximum value or standard deviation. For example, magnitude-frequency data are scaled to lie between 0 and 1 before they are quantized and put into the compressed data packet. The standard score is computed from the residuals using a normalization process where the mean is subtracted and the result is divided by the standard deviation.)

In step 725, peaks in the normalized spectral data above a threshold amplitude are clipped, i.e., the value for the base resolution frequency bin is re-set to the value of the clipping threshold. Clipping the normalized data at the clipping threshold is used to prevent poor AR modeling behavior. The clipped normalized data, noise estimate, and original phase angles are combined to produce clipped frequency data.

In step 727 the spectrum above the maximum frequency of interest is removed from the model by truncating the spectral data starting at the first frequency bin that is greater than the maximum frequency of interest. This is analogous to downsampling the data in the frequency domain. Thus, data above the desired processing range is removed. In step 729, an inverse Fourier transform (e.g., the IFFT) is applied to convert the clipped normalized spectrum to a clipped normalized time series in the time domain for each remaining beam.

In step 730 the coefficients of an autoregressive (AR) model are determined. In step 740 the AR model is used to derive the residuals and the residuals are quantized.

In the illustrated embodiment, step 730 includes step 731, step 733 and step 735. In step 731, the model coefficients for the clipped normalized time series are determined. The model comprises AR coefficients. AR coefficients are defined by the Equation 1.

$$X(i) = K + \Sigma_{j=1 \, to \, P} C_j X(i-j) + \epsilon(i) \quad (1)$$

where X(i) indicates the value of the acoustic pressure time series at time sample i within the time block, K is a constant, $\epsilon(i)$ is a noise estimate for time sample i, and the Cj are the AR coefficient for an AR model of order P. Thus the AR model coefficients are used to predict the next time sample given the most recent time samples. Any method may be used. For example, linear predictive coding (LPC) and Burg's algorithm have produced nearly identical results, and either can be applied to model the data. Both methods are described in Chapter 3 of: Stoica, Petre and Moses, Randolph, *Introduction to Spectral Analysis*, Prentice Hall, Upper Saddle River, N.J., 1997 (hereinafter Stoica et al.); the entire contents of Chapter 3 are hereby incorporated by reference insofar as the terminology is not inconsistent with that used herein. Autoregressive (AR) parameters for LPC are based on solving the Yule-Walker equations, which can be done with the Levinson-Durbin recursion, the details of which are described on pages 89-97 of Stoica et al.. AR parameters can also be computed using Burg's method, which is described on pages 120-123 of Stoica et al..

In the illustrated embodiment an AR model of order between about 100 and about 200 is used. In step 733, the AR coefficients are converted to reflection coefficients, which have better quantization properties. Reflection coefficients are described on pages 120-123 of Stoica et al..

In step 735 the inverse filter corresponding to the AR model is determined. Any inverse AR filtering (also known as moving average, MA, filtering) procedure known in the art to get the residuals, also called prediction error, may be used (see for example, Rabiner L. R. and Schafer, R. W., Digital Processing of Speech Signals, Prentice Hall, pp. 421, 1978, the entire contents of which are hereby incorporated by reference except for terminology that is inconsistent with that used herein).

In step 741, the time series is passed through the inverse AR filter to produce residuals. The residuals have the property that if they are passed through the AR filter, then the original time series data can be recovered exactly. However, because the AR coefficients and the residuals are quantized for insertion into the limited sized data packet to achieve compression, the coefficient used during decompression are not exact and introduce a certain amount of signal degradation based on the level of quantization.

There are residuals for every time sample. The residuals can be thought of as the error between the actual BTS data and the AR model of the normalized clipped data. To achieve compression of the residuals, they are converted to the frequency domain in step 743 by determining the discrete cosine transform (DCT) of the residuals for the base resolution frequency bins below the splitting frequency. In addition, the DCT of the residuals allows greater control over the data that is saved, such as being able to recover data in specific frequency bands that best address the goals of an application, e.g., as indicated in the targets field 565 of the shared data data structure. The residuals tend to have a Gaussian distribution; and, therefore, the DCT of the residuals appears Gaussian distributed as well.

In step 745, the DCT amplitudes are combined for the correlated frequency bands in the correlated beams. As stated above, residuals between adjacent beams exhibit some correlation. At lower frequencies, the correlation is greater, so the amount that the residuals can be reduced is significant. As the frequencies become higher, there is less correlation in the residuals, so the amount that the residuals are reduced is decreased.

In step 747 the DCT values in the frequency bins to be retained (based on the target frequencies indicated in the targets field 565) are quantized using scaling factors indicated in field 586 also in the shared data data structure 550. A scaling factor affects the precision to which the DCT of the residuals are quantized, which forms the tradeoff between bits/residual value and quantization accuracy.

FIG. 7C is a flow diagram that illustrates a method 750 for performing a peak selection step 413 of the method 400 of FIG. 4, according to an embodiment. In step 751 a coherent OR is performed on all peaks in each base resolution frequency bin above some threshold frequency, such as the splitting frequency, as described in 705 of method 700. For example, beams in each layer are bin-ORed down to the base resolution, renormalized, and then ORed across all layers.

In step 753, peaks in the upper band from all remaining beams are sorted by magnitude in the base resolution. In step 755, the N highest peaks are selected, where N is chosen based on the data rate that is available to use, and the indices at these peaks are saved as described above. Since the data was sorted over all beams, this allows the algorithm to save off more signals on noisy beams and less data from quiet beams, where it is sufficient to use AR modeling to fill in the non-signal data. In step 757 the bin index and magnitude and phase of the N peaks are determined. For example, the values in the unwindowed FFT of the BTS data at the peak-picked bin indices are selected.

In step 759 the phase and normalized magnitude at the bins of the peaks are quantized. For example, the complex values are preserved by saving them in magnitude/phase format. In and illustrated embodiments, phase angles are linearly quantized; and magnitudes are normalized to the range zero to one, and then non-linearly quantized using μ-law companding. Companding algorithms reduce the dynamic range of an audio signal. In analog systems, this can increase the signal-to-noise ratio (SNR) achieved during transmission, and in the digital domain, it can reduce the quantization error (hence increasing signal to quantization noise ratio). These SNR increases can be traded instead for reduced bandwidth for equivalent SNR. The μ-law companding is described by Equation 2.

$$F(x) = \text{sgn}(x) * ln(1 + \mu * |x|) / ln(1 + \mu) \quad (2)$$

Where F is the non-linear quantized representation of the normalized magnitude value x, sgn(x) indicates the sign of x, ln is the natural logarithm and p. is the maximum value (e.g., 255 for eight bits).

FIG. 8A through FIG. 8D are graphs that illustrate evolution of a complex spectrum during data compression and decompression, according to an embodiment. FIG. 8A depicts the complex spectrum 810 of one remaining beam. The horizontal axis 802 is frequency and the vertical axis 804 is amplitude. Normalization determines a noise estimate, which in the case of FIG. 8A is linear with a bias 814 and trend 812 for the spectrum 810. Normalized data referenced to the noise estimate are compared to a clipping threshold in which data that exceed the threshold are set to the clipping threshold.

The clipped spectral data is created by multiplying the clipped normalized data with the noise estimate, producing the result depicted by 820. The resulting complex spectrum 820 is depicted in FIG. 8B with the same horizontal and vertical axes 802 and 804, respectively. Note that the features in the lower frequency portion of the spectrum 820 capture the features of the original spectrum 810, while higher frequency features are lost. Those will be restored by the narrowband peak selection and insertion, which take much less data to represent than would residuals throughout the upper band. The AR model without residuals estimates the background noise levels in the upper frequency band.

FIG. 8C with the same horizontal and vertical axes 802 and 804, respectively, shows the same spectrum 820 with the splitting frequency 830 indicated. In FIG. 8D with the same horizontal and vertical axes 802 and 804, respectively, the narrowband peak data is indicated by the bars 840a, 840b, 840c, 840d, 840e and 840f. These peaks are added to the spectrum 820 to produce the upper band spectrum 850 with the narrowband peaks restored.

FIG. 9 is a flow diagram that illustrates a method 900 for performing wideband decompression steps 611 and 613 of the method of FIG. 6, according to an embodiment. A model of the data is composed from the lower band residuals, noise, and the AR model coefficient and used with narrowband peaks to compute the spectrum for the time block.

In step 901, the wide frequency band is determined from quantized residuals in the lower band and scaled noise in the upper band. Step 901 includes steps 911 which encapsulates steps 913, 915, 917 and 919. In step 911 the lower band residuals are passed through a non-linear contrast enhancement. This can be considered perceptual enhancement, which is used to counter signal loss due to quantization of AR model coefficients and residuals. The signs of residual values are kept.

In step 913, a set A of residuals is obtained by raising the magnitude of the residuals to the power given by a scalar parameter Ka (greater than 1). In step 915, a set B of residuals is obtained by multiplying the magnitudes of the residuals by a constant Kb (greater than 1). In step 917 the minima is determined between the two sets of A and B at each frequency bin. In step 919 the minimum is multiplied by the previously saved sign and is used as the new set of residual values for the lower band, as indicated by Equation 2.

$$R(f) = \text{sign}(r(f)) * \min(r(f)^{Ka}, r(f) * Kb) \quad (2)$$

Where r(f) is the contrast-enhanced residual at frequency bin f and R(f) is the restored residual at frequency bin f.

In step 903, an inverse DCT (IDCT) is applied to the restored residuals to produce a residuals time series. In step 905 the residuals time series is passed through the AR filter based on the quantized AR coefficients to produce a modeled time series. In step 907 the modeled time series is converted to a modeled complex spectrum. In step 909, the modeled complex spectrum is multiplied in the upper band by a factor less than one to reduce noise. In some embodiments, step 909 is omitted.

The remaining steps of method 600 add back in the narrowband peaks and complete the decompression as described above with reference to FIG. 6A.

Experimental embodiments have achieved compression ratios of 16:1 and 24:1 up to 30:1 and 40:1 when more signal loss can be tolerated, while preserving features of interest in the reconstructed time series. Even higher compression ratios have been achieved using beam combination factors of two and four at the expense of directional resolution of signals of interest.

6. Hardware Overview

FIG. 10 is a block diagram that illustrates a computer system 1000 upon which an embodiment of the invention may be implemented. Computer system 1000 includes a communication mechanism such as a bus 1010 for passing information between other internal and external components of the computer system 1000. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit).). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1000, or a portion thereof, constitutes a means for performing one or more steps of one or more methods described herein.

A sequence of binary digits constitutes digital data that is used to represent a number or code for a character. A bus 1010 includes many parallel conductors of information so that information is transferred quickly among devices coupled to the bus 1010. One or more processors 1002 for processing information are coupled with the bus 1010. A processor 1002 performs a set of operations on information. The set of operations include bringing information in from the bus 1010 and placing information on the bus 1010. The set of operations also typically include comparing two or more units of information, shifting positions of units of information, and combining two or more units of information, such as by addition or multiplication. A sequence of operations to be executed by the processor 1002 constitutes computer instructions.

Computer system 1000 also includes a memory 1004 coupled to bus 1010. The memory 1004, such as a random access memory (RAM) or other dynamic storage device, stores information including computer instructions. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of computer instructions. The computer system 1000 also includes a read only memory (ROM) 1006 or other static storage device coupled to the bus 1010 for storing static information, including instructions, that is not changed by the computer system 1000. Also coupled to bus 1010 is a non-volatile (persistent) storage device 1008, such as a magnetic disk or optical disk, for storing information, including instructions, that persists even when the computer system 1000 is turned off or otherwise loses power.

Information, including instructions, is provided to the bus 1010 for use by the processor from an external input device 1012, such as a keyboard containing alphanumeric keys operated by a human user, or a sensor. A sensor detects conditions in its vicinity and transforms those detections into signals compatible with the signals used to represent information in computer system 1000. Other external devices coupled to bus 1010, used primarily for interacting with humans, include a display device 1014, such as a cathode ray tube (CRT) or a liquid crystal display (LCD), for presenting images, and a pointing device 1016, such as a mouse or a trackball or cursor direction keys, for controlling a position of a small cursor image presented on the display 1014 and issuing commands associated with graphical elements presented on the display 1014.

In the illustrated embodiment, special purpose hardware, such as an application specific integrated circuit (IC) 1020, is coupled to bus 1010. The special purpose hardware is configured to perform operations not performed by processor 1002 quickly enough for special purposes. Examples of application specific ICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 1070 sends and receives electrical, acoustic or electromagnetic signals, including infrared and optical signals, that carry information streams, such as digital data.

The term computer-readable medium is used herein to refer to any medium that participates in providing information to processor 1002, including instructions for execution. Such a medium may take many forms, including, but not limited to, non-volatile media, volatile media and transmission media. Non-volatile media include, for example, optical or magnetic disks, such as storage device 1008. Volatile media include, for example, dynamic memory 1004. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 1002, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Logic encoded in one or more tangible media includes one or both of processor instructions on a computer-readable storage media and special purpose hardware, such as ASIC*1020.

Network link 1078 typically provides information communication through one or more networks to other devices that use or process the information. For example, network link 1078 may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090. A computer called a server 1092 connected to the Internet provides a service in response to information received over the Internet. For example, server 1092 provides information representing video data for presentation at display 1014.

The invention is related to the use of computer system 1000 for implementing the techniques described herein. According to one embodiment of the invention, those techniques are performed by computer system 1000 in response to processor 1002 executing one or more sequences of one or more instructions contained in memory 1004. Such instructions, also called software and program code, may be read into memory 1004 from another computer-readable medium such as storage device 1008. Execution of the sequences of instructions contained in memory 1004 causes processor 1002 to perform the method steps described herein. In alternative embodiments, hardware, such as application specific integrated circuit 1020, may be used in place of or in combination with software to implement the invention. Thus, embodiments of the invention are not limited to any specific combination of hardware and software.

The signals transmitted over network link 1078 and other networks through communications interface 1070, carry information to and from computer system 1000. Computer system 1000 can send and receive information, including program code, through the networks 1080, 1090 among others, through network link 1078 and communications interface 1070. In an example using the Internet 1090, a server 1092 transmits program code for a particular application, requested by a message sent from computer 1000, through Internet 1090, ISP equipment 1084, local network 1080 and communications interface 1070. The received code may be executed by processor 1002 as it is received, or may be stored in storage device 1008 or other non-volatile storage for later execution, or both. In this manner, computer system 1000 may obtain application program code in the form of a signal on a carrier wave.

Various forms of computer readable media may be involved in carrying one or more sequence of instructions or data or both to processor 1002 for execution. For example, instructions and data may initially be carried on a magnetic disk of a remote computer such as host 1082. The remote computer loads the instructions and data into its dynamic memory and sends the instructions and data over a telephone line using a modem. A modem local to the computer system 1000 receives the instructions and data on a telephone line and uses an infra-red transmitter to convert the instructions and data to a signal on an infra-red a carrier wave serving as the network link 1078. An infrared detector serving as communications interface 1070 receives the instructions and data carried in the infrared signal and places information representing the instructions and data onto bus 1010. Bus 1010 carries the information to memory 1004 from which processor 1002 retrieves and executes the instructions using some of the data sent with the instructions. The instructions and data received in memory 1004 may optionally be stored on storage device 1008, either before or after execution by the processor 1002.

Figure 11:
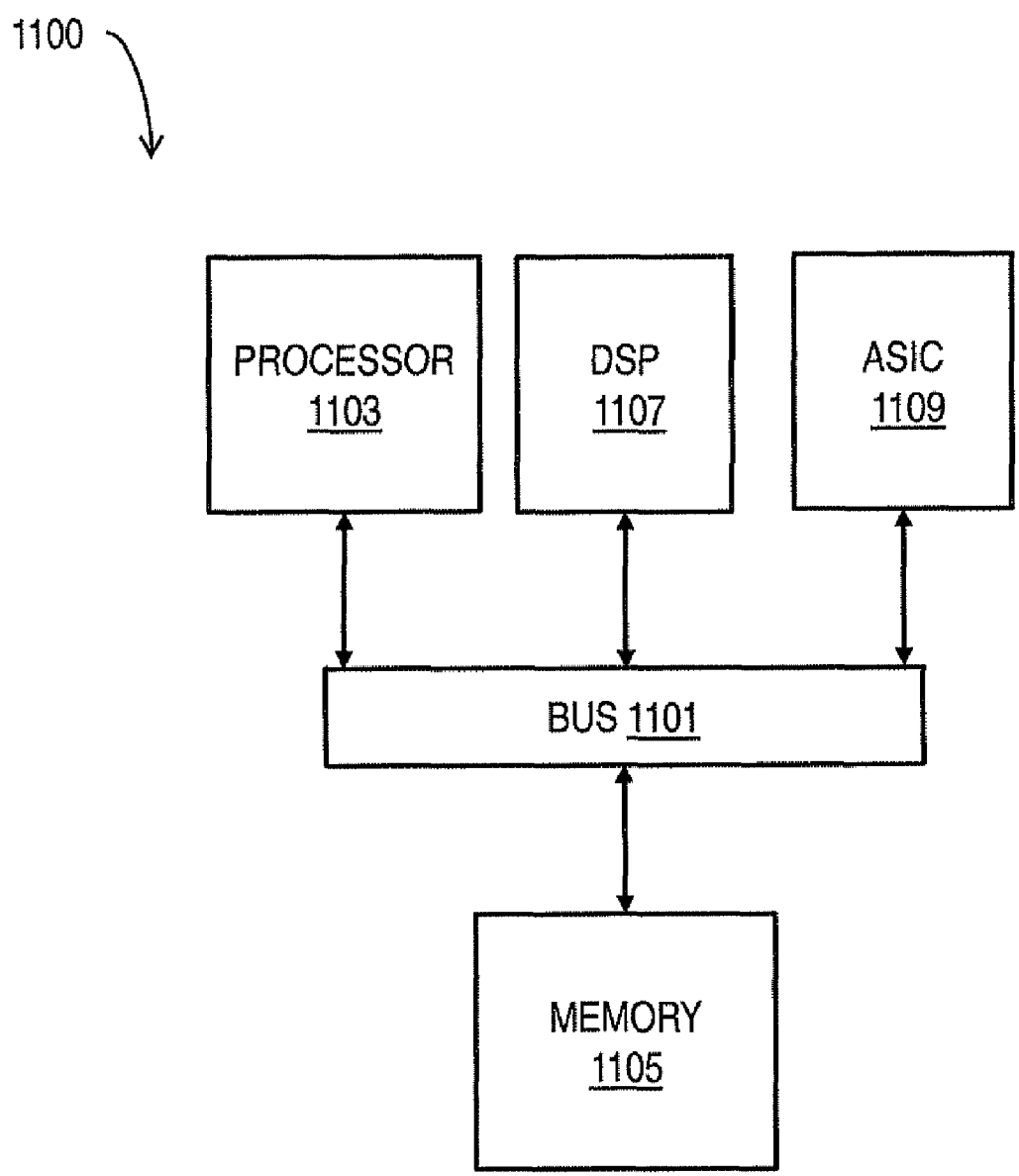
FIG. 11 illustrates a chip set upon which an embodiment of the invention may be implemented.

FIG. 11 illustrates a chip set 1100 upon which an embodiment of the invention may be implemented. Chip set 1100 is programmed to perform one or more steps of a method described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1100, or a portion thereof, constitutes a means for performing one or more steps of a method described herein.

In one embodiment, the chip set 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform one or more steps of a method described herein. The memory 1105 also stores the data associated with or generated by the execution of one or more steps of the methods described herein.

7. Extensions and Alternatives.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method executed responsive to processor execution of instructions stored in a nontransitory storage medium, the method comprising:

determining coefficients of a complex auto regression (AR) model to fit a complex average spectrum at a base frequency resolution of a set of one or more measured acoustic beams received at an acoustic array during a time block;

determining residuals by filtering actual data through an inverse of the AR model at frequencies below a first threshold frequency;

determining a quantized spectrum of the residuals at the base frequency resolution;

determining magnitude, phase, and frequency bin at the base frequency resolution, for each peak of a set of one or more narrowband peaks above a second threshold frequency for the set of one or more measured acoustic beams; and sending a message that indicates without loss the quantized coefficients of the AR model, the quantized spectrum of the residuals, and the frequency bin, quantized magnitude and quantized phase for each peak of the set of one or more narrowband peaks to facilitate remote monitoring of the acoustic array.

2. A method as recited in claim 1, wherein sending the message further comprises sending the message over a communications channel within a communication time that is no greater than the time block.

3. A method as recited in claim 2, wherein determining the quantized spectrum of the residuals further comprises determining a portion of a computed spectrum for the residuals, which portion can be compressed losslessly to fit in a first fraction of the message.

4. A method as recited in claim 3, wherein determining magnitude, phase, and frequency bin for each peak of the set of one or more narrowband peaks further comprises determining the set of one or more narrowband peaks for which frequency bin, magnitude and phase can be compressed losslessly to fit in a second fraction of the message, which second fraction is less than a difference between one and the first fraction.

5. A method as recited in claim 4, wherein determining the set of one or more narrowband peaks for which frequency bin, magnitude and phase can be compressed losslessly to fit in the second fraction of the message further comprises:

sorting detected narrowband peaks above the second threshold by magnitude of peak; and including in the set of one or more narrowband peaks only the largest magnitude narrowband peaks for which frequency bin, magnitude and phase can be compressed losslessly to fit in the second fraction of the message.

6. A method as recited in claim 1, wherein determining the frequency bin, magnitude and phase of the set of one or more narrowband peaks further comprises:
   determining a plurality of spectra above the second threshold frequency at a corresponding plurality of frequency resolutions supported by the time block; and
   selecting one or more peaks at each frequency resolution for consideration to include in the set of one or more narrowband peaks.

7. A method as recited in claim 6, wherein the base frequency resolution is broader than a finest frequency resolution of the plurality of frequency resolutions.

8. A method as recited in claim 1, wherein, the method further comprises
   determining different coefficients of a complex auto regression (AR) model to fit a different complex average spectrum at the base frequency resolution of a different set of one or more measured acoustic beams during the time block;
   determining different residuals between actual data and the AR model using the different coefficients at frequencies below the first threshold frequency;
   determining a different quantized spectrum of the different residuals at the base frequency resolution; and
   the message also indicates without loss the different quantized spectrum.

9. A method as recited in claim 8, wherein the different quantized spectrum excludes a fraction of a bandwidth of the quantized spectrum in which fraction corresponding magnitudes are expected to be similar to the quantized spectrum.

10. A method as recited in claim 1, further comprising causing a recipient of the message to reconstruct a time series based on the coefficients of the AR model, the quantized spectrum of the residuals, and the frequency bin, magnitude and phase for each peak of the set of one or more narrowband peaks.

11. Logic encoded in one or more nontransitory tangible media which, responsive to execution, causes a processor to:
   determine coefficients of a complex auto regression (AR) model to fit a complex average spectrum at a base frequency resolution of a set of one or more measured acoustic beams received at an acoustic array during a time block;
   determine residuals by filtering actual data through an inverse of the AR model at frequencies below a first threshold frequency;
   determine a quantized spectrum of the residuals at the base frequency resolution;
   determine magnitude, phase, and frequency bin at the base frequency resolution, for each peak of a set of one or more narrowband peaks above a second threshold frequency for the set of one or more measured acoustic beams; and
   send a message that indicates without loss the quantized coefficients of the AR model, the quantized spectrum of the residuals, and the frequency bin, quantized magnitude and quantized phase for each peak of the set of one or more narrowband peaks to facilitate remote monitoring of the acoustic array.

* * * * *